United States Patent
Yuan et al.

(10) Patent No.: US 12,255,842 B2
(45) Date of Patent: Mar. 18, 2025

(54) METHODS, APPARATUS AND SYSTEMS FOR REFERENCE SIGNAL CONFIGURATION IN WIRELESS COMMUNICATIONS

(71) Applicant: ZTE Corporation, Shenzhen (CN)

(72) Inventors: Zhifeng Yuan, Shenzhen (CN); Yihua Ma, Shenzhen (CN); Yuzhou Hu, Shenzhen (CN); Weimin Li, Shenzhen (CN); Zhigang Li, Shenzhen (CN); Liujun Hu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 321 days.

(21) Appl. No.: 17/869,604

(22) Filed: Jul. 20, 2022

(65) Prior Publication Data
US 2023/0122481 A1    Apr. 20, 2023

Related U.S. Application Data

(63) Continuation of application No. PCT/CN2020/074021, filed on Jan. 23, 2020.

(51) Int. Cl.
*H04L 5/00*     (2006.01)
*H04W 72/115*   (2023.01)

(52) U.S. Cl.
CPC ......... *H04L 5/0051* (2013.01); *H04W 72/115* (2023.01)

(58) Field of Classification Search
None
See application file for complete search history.

(56) References Cited

U.S. PATENT DOCUMENTS

| | | | |
|---|---|---|---|
| 6,047,023 A * | 4/2000 | Arnstein | H04L 27/103 375/139 |
| 6,625,236 B1 * | 9/2003 | Dent | H04L 25/03318 714/794 |
| 2017/0155434 A1 | 6/2017 | Kim et al. | |
| 2018/0278395 A1 * | 9/2018 | Yoon | H04L 5/0051 |

(Continued)

FOREIGN PATENT DOCUMENTS

| CN | 108370586 A | 8/2018 |
|---|---|---|
| CN | 109391311 A | 2/2019 |
| WO | WO 2018/027909 A1 | 2/2018 |
| WO | WO 2018061572 A1 | 4/2018 |

OTHER PUBLICATIONS

European Search Report for Application No. 20886452.0 dated Sep. 1, 2023 (9 pages).

(Continued)

*Primary Examiner* — Lonnie V Sweet
(74) *Attorney, Agent, or Firm* — Crowell & Moring LLP

(57) ABSTRACT

Methods, apparatus and systems for reference signal configuration in a wireless communication are disclosed. In one embodiment, a method performed by a wireless communication device is disclosed. The method comprises: generating a pilot signal occupying N symbol resources, wherein the pilot signal includes at least one most sparse reference signal (RS) port that is determined from a predetermined pool of most sparse RS ports, wherein the predetermined pool includes at least N most sparse RS ports, wherein N is an integer larger than one; and transmitting a signal comprising the pilot signal to a wireless communication node.

14 Claims, 30 Drawing Sheets

(56) References Cited

U.S. PATENT DOCUMENTS

| | | | | |
|---|---|---|---|---|
| 2019/0215050 | A1* | 7/2019 | Kumagai | H04B 7/0617 |
| 2020/0099465 | A1* | 3/2020 | Gao | H04W 76/27 |
| 2020/0162228 | A1* | 5/2020 | Gao | H04L 5/10 |
| 2020/0186310 | A1* | 6/2020 | Yang | H04L 27/2621 |
| 2021/0297202 | A1* | 9/2021 | Liu | H04L 5/0092 |
| 2022/0311574 | A1* | 9/2022 | Gao | H04L 5/0051 |
| 2023/0008945 | A1* | 2/2023 | Zhang | H04W 74/0833 |

OTHER PUBLICATIONS

Zhifeng Yuan et al, "Contention-based Grant-free Transmission with Extremely Sparse Orthogonal Pilot Scheme", 2021 IEEE 94$^{th}$ Vehicular Technology Conference, Sep. 27, 2021 (9 pages).

NTT DOCOMO. Inc., "NOMA related procedures", 3GPP TSG RAN WGI Meeting #94bis R1-1811362, Sep. 29, 2018, sections 2, 4 (6 pages).

VIVO,"Remaining issues and text proposals on CSI measurement", 3GPP TSG RAN WGI Meeting AH 1801 R1-1800183, Jan. 13, 2018, sections 2.1-2.2 (6 pages).

Huawei et al., "Discussion on NOMA related procedures", 3GPP TSG RAN WGI Meeting #95 R1-1812189, Nov. 3, 2018, section 2 (14 pages).

International Search Report and Written Opinion for International Application No. PCT/CN2020/074021 mailed Oct. 28, 2020 (7 pages).

Kazuaki Takeda, NTT DOCOMO, Inc. "Study on New Radio Access Technology", 3GPP TSG RAN meeting #75, RP-170376, Mar. 6, 2017 (157 pages).

Chinese First Office Action for Application No. 2020800943625 mailed Jul. 1, 2024, including English translation (15 pages).

* cited by examiner

Each RBDRS port group is divided into four RBDRS ports based on four length-4 orthogonal sequences:

Table 2:

| 1 | 1 | j | -j |
|---|---|---|---|
| 1 | 1 | -j | j |
| 1 | -1 | j | j |
| 1 | -1 | -j | -j |

Table 3:

| No. | c1 | c2 | c3 | c4 | No. | c1 | c2 | c3 | c4 |
|---|---|---|---|---|---|---|---|---|---|
| 1 | … | … | … | … | 33 | 1 | 1 | 1 | j |
| 2 | … | … | … | … | 34 | 1 | 1 | -1 | -j |
| 3 | … | … | … | … | 35 | 1 | -1 | 1 | -j |
| 4 | … | … | … | … | 36 | 1 | -1 | -1 | j |
| 5 | 1 | 1 | j | j | 37 | … | … | … | … |
| 6 | 1 | 1 | -j | -j | 38 | … | … | … | … |
| 7 | 1 | -1 | j | -j | 39 | … | … | … | … |
| 8 | 1 | -1 | -j | j | 40 | … | … | … | … |
| 9 | … | … | … | … | 41 | 1 | j | 1 | 1 |
| 10 | … | … | … | … | 42 | 1 | j | -1 | -1 |
| 11 | … | … | … | … | 43 | 1 | -j | 1 | -1 |
| 12 | … | … | … | … | 44 | 1 | -j | -1 | 1 |
| 13 | 1 | j | j | -1 | 45 | … | … | … | … |
| 14 | 1 | j | -j | 1 | 46 | … | … | … | … |
| 15 | 1 | -j | j | 1 | 47 | … | … | … | … |
| 16 | 1 | -j | -j | -1 | 48 | … | … | … | … |
| 17 | … | … | … | … | 49 | 1 | 1 | 1 | -j |
| 18 | … | … | … | … | 50 | 1 | 1 | -1 | j |
| 19 | … | … | … | … | 51 | 1 | -1 | 1 | j |
| 20 | … | … | … | … | 52 | 1 | -1 | -1 | -j |
| 21 | 1 | 1 | j | j | 53 | … | … | … | … |
| 22 | 1 | 1 | -j | -j | 54 | … | … | … | … |
| 23 | 1 | -1 | j | -j | 55 | … | … | … | … |
| 24 | 1 | -1 | -j | j | 56 | … | … | … | … |
| 25 | … | … | … | … | 57 | 1 | j | 1 | -1 |
| 26 | … | … | … | … | 58 | 1 | j | -1 | 1 |
| 27 | … | … | … | … | 59 | 1 | -j | 1 | 1 |
| 28 | … | … | … | … | 60 | 1 | -j | -1 | -1 |
| 29 | 1 | j | j | 1 | 61 | … | … | … | … |
| 30 | 1 | j | -j | -1 | 62 | … | … | … | … |
| 31 | 1 | -j | j | -1 | 63 | … | … | … | … |
| 32 | 1 | -j | -j | 1 | 64 | … | … | … | … |

FIG. 19

METHODS, APPARATUS AND SYSTEMS FOR REFERENCE SIGNAL CONFIGURATION IN WIRELESS COMMUNICATIONS

CROSS-REFERENCE TO RELATED APPLICATIONS

This application is a continuation of International Patent Application No. PCT/CN2020/074021, filed Jan. 23, 2020. The contents of International Patent Application No. PCT/CN2020/074021 are herein incorporated by reference in their entirety.

TECHNICAL FIELD

The disclosure relates generally to wireless communications and, more particularly, to methods, apparatus and systems for reference signal configuration in a wireless communication.

BACKGROUND

In a wireless network, e.g. a fifth generation (5G) new radio (NR) system, an Internet of Things (IoT) system, or a machine type communication (MTC), many terminals want to access the network side for an ultra low power consumption service transmission or an ultra low signaling overhead service transmission or an ultra-reliable and low-latency service transmission. Accordingly, a grant-free access or grant-free transmission has been proposed, where there is no need of grant or scheduling from a base station before a terminal transmits data to the base station or another receiver. Therefore, there is no need of the associated interactive processes between the terminal and the base station, which can avoid the overhead caused by these interactive processes. There are two types of grant-free transmissions: a semi-persistent scheduling based grant-free (configured grant) transmission and a contention-based grant-free transmission. In both types of grant-free transmissions, there is no need of dynamic scheduling of the base station before the terminal transmitting data.

Both types of grant-free data transmissions are based on reference signals. When a traditional reference signal (RS) is used under a grant-free access or grant-free transmission scenario, the same reference signal is used not only for active user identification, but also for channel estimation, including the estimation of the wireless channels and the time/frequency offset, which requires reference signal to be spread over the entire transmission bandwidth and time period. This requires a heavy responsibility for the reference signal. As such, each reference signal occupies a large amount of resources. Therefore, given a certain resource overhead, the number of reference signals is very limited, and it is difficult to support a high-loading grant-free access with existing reference signal configurations.

Thus, existing systems and methods for reference signal configuration in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: generating a pilot signal occupying N symbol resources, wherein the pilot signal includes at least one reference signal (RS) port that is determined from a predetermined pool of RS ports, wherein the predetermined pool includes at least N RS ports, wherein N is an integer larger than one; and transmitting a signal comprising the pilot signal to a wireless communication node.

In another embodiment, a method performed by a wireless communication device is disclosed. The method comprises: generating a pilot signal including at least one reference signal (RS) port that is determined from a predetermined pool of RS ports, wherein each of the RS ports in the predetermined pool has at most two non-zero elements; and transmitting a signal comprising the pilot signal to a wireless communication node.

In a different embodiment, a method performed by a wireless communication device is disclosed. The method comprises: generating a pilot signal occupying N symbol resources, wherein the pilot signal includes at least one reference signal (RS) port that is determined from a predetermined pool of RS ports, wherein each of the RS ports in the predetermined pool has Nz non-zero elements, wherein N is an integer larger than 24, and wherein Nz is an integer larger than 0 and less than 9; and transmitting a signal comprising the pilot signal to a wireless communication node.

In a further embodiment, a method performed by a wireless communication node is disclosed. The method comprises: receiving, from a wireless communication device, a signal comprising a pilot signal. The pilot signal occupies N symbol resources. The pilot signal includes at least one reference signal (RS) port that is determined from a predetermined pool of RS ports. The predetermined pool includes at least N RS ports. N is an integer larger than one.

In another embodiment, a method performed by a wireless communication node is disclosed. The method comprises: receiving, from a wireless communication device, a signal comprising a pilot signal. The pilot signal includes at least one reference signal (RS) port that is determined from a predetermined pool of RS ports. Each of the RS ports in the predetermined pool has at most two non-zero elements.

In yet another embodiment, a method performed by a wireless communication node is disclosed. The method comprises: receiving, from a wireless communication device, a signal comprising a pilot signal. The pilot signal occupies N symbol resources. The pilot signal includes at least one reference signal (RS) port that is determined from a predetermined pool of RS ports. Each of the RS ports in the predetermined pool has Nz non-zero elements. N is an integer larger than 24. Nz is an integer larger than 0 and less than 9.

In a different embodiment, a wireless communication node configured to carry out a disclosed method in some embodiment is disclosed. In yet another embodiment, a wireless communication device configured to carry out a disclosed method in some embodiment is disclosed. In still another embodiment, a non-transitory computer-readable medium having stored thereon computer-executable instructions for carrying out a disclosed method in some embodiment is disclosed. The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIG. 19 illustrates a table of exemplary non-orthogonal sequences for generating a pool of reference signal ports, in accordance with some embodiments of the present disclosure.

DETAILED DESCRIPTION OF EXEMPLARY EMBODIMENTS

Figure 1:
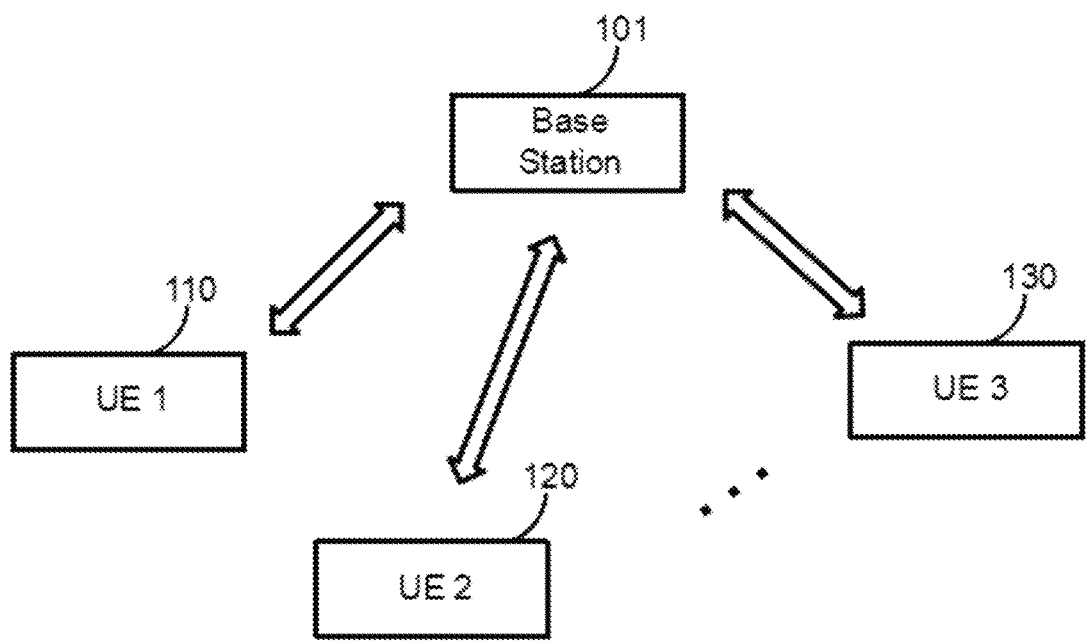
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. To have a low-latency communication or a low power consumption communication or a low signaling overhead communication, a UE may transmit data to the BS with a grant-free transmission, which may be a semi-persistent scheduling based grant-free (configured grant) transmission and a contention-based grant-free transmission.

For a semi-persistent scheduling grant-free transmission, the base station first assigns transmission resources including reference signals to a terminal applying to access the base station. Then the terminal may perform multiple data transmissions to the base station within a time window. Each of the data transmissions is performed according to the transmission resources pre-configured by the base station. Based on these reference signals, the base station can perform active user discovery and channel estimation for these users, which is a broad channel estimation including wireless channel estimation and time-frequency offset estimation, etc. Then the base station can perform multi-user data detection, demodulation, decoding, etc.

A contention-based grant-free transmission is initiated by a terminal without any scheduling or grant by the base station. When the terminal performs a contention-based grant-free transmission, it autonomously determines the transmission resources including reference signals. Similar to the semi-persistent scheduling based grant-free transmission, the base station uses the reference signals to perform active user discovery and channel estimation for these users, where the channel estimation is a broad channel estimation including wireless channel estimation and time-frequency offset estimation, etc. Then the base station can perform multi-user data detection, demodulation, decoding, etc.

As such, both types of grant-free data transmissions are based on reference signals. In order to support these two types of grant-free access, the system may define a reference signal set or pool, which contains several reference signals.

In a semi-persistent scheduling based grant-free transmission, the base station assigns in advance a reference signal to each user requesting access. In order to simplify multi-user detection and ensure access robustness, the base station usually assigns different reference signals to different users. Therefore, when a set of system-defined reference signals contains N different reference signals, and different users are assigned with different reference signals, the system can support up to N numbers of semi-persistent scheduling based grant-free access users. In order to support more users, the number of reference signals must be increased, which means to increase the size of the reference signal set/pool, which will increase the overhead of the reference signals and the detection complexity.

In a contention-based grant-free data transmission, the terminal will select the reference signal from the system-defined reference signal set/pool, such that the reference signals selected by different terminals are independent of each other. From the perspective of the base station, the process for the terminal to select the reference signal is random. This inevitably induces two users/terminals to select an identical reference signal, which is also called a collision of reference signals. For example, assuming that the system-defined set/pool of reference signals comprises N reference signals, the probability for two users to select the same reference signal is 1/N. Once the reference signal collision happens, it will lead to not only a missed detection of the active user detection, but also serious problems of channel estimation based on the collided reference signal, which may eventually lead to a failure of data demodulation. As the number of access users increases, the probability of reference signal collision will increase. In order to support more contention-based grant-free access users, the collision rate of reference signals should be reduced. If the number of reference signals is increased to reduce the collision rate, the size of the set/pool of reference signals may be increased, which can increase overhead and detection complexity of the reference signals.

As such, for both types of grant-free access, the number of supported users is limited by the number of reference signals. To support more grant-free user access, the system needs to define as many reference signals as possible, or the system-defined reference signal set/pool should include as many reference signals or reference signal ports as possible. But both types of grant-free access in an existing system need the reference signal to perform the channel estimation, for data symbol demodulation. Such a reference signal is also commonly referred to as a demodulation reference signal (DMRS). Therefore, each of the reference signals will need to occupy sufficient resources in the entire transmission bandwidth. In other words, each reference signal in an existing system cannot be too sparse in the entire transmission bandwidth, and it must have a certain density, so that the wireless multipath channel (i.e., frequency selective channel and timing offset) in the entire transmission bandwidth can be estimated. Furthermore, if a frequency offset of each access user also needs to be compensated, each reference signal in an existing system must have a certain density in the entire transmission time.

This present teaching proposes a new reference signal design and corresponding advanced multi-user detection method on the receiving side, to easily and efficiently realize grant-free access for an ultra-high payload. One purpose of the present teaching is to support as many users as possible with grant-free access using a simple transmission and reception scheme.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), a non-terrestrial reception point for satellite/fire balloon/unmanned aerial vehicle (UAV) communication, a radio transceiver in a vehicle of a vehicle-to-vehicle (V2V) wireless network, etc.; while a UE in the present disclosure can be referred to as a terminal and can include, or be implemented as, a mobile station (MS), a station (STA), a terrestrial device for satellite/fire balloon/unmanned aerial vehicle (UAV) communication, a radio transceiver in a vehicle of a vehicle-to-vehicle (V2V) wireless network, etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 ... UE 3 130, where the BS 101 can communicate with the UEs according to wireless protocols. Each UE may transmit uplink data to the BS 101 with a grant-free transmission based on a reference signal selected from a reference signal set.

Figure 2:
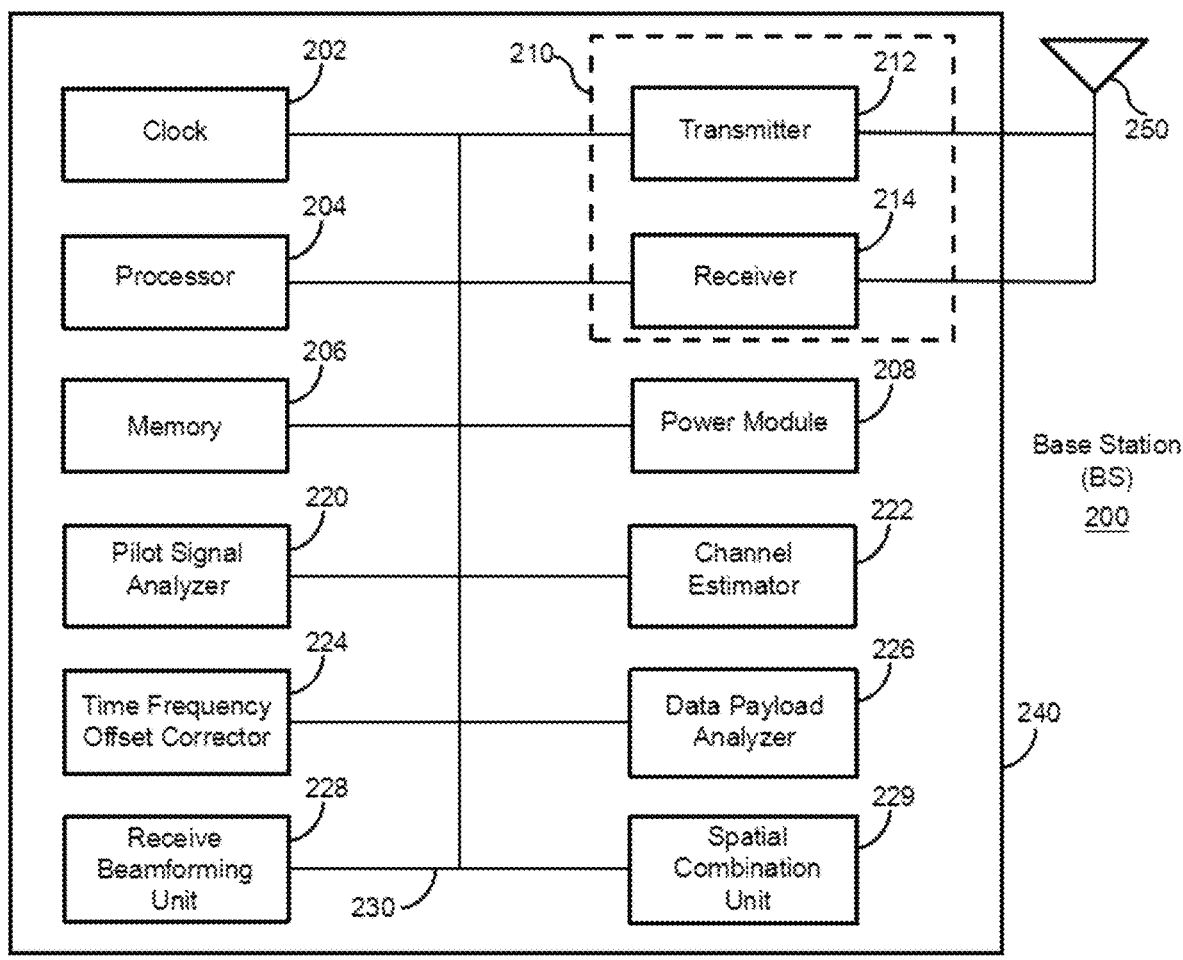
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a pilot signal analyzer 220, a channel estimator 222, a time frequency offset corrector 224, a data payload analyzer 226, a receive beamforming unit 228, and a spatial combination unit 229.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may receive a signal via an uplink transmission from a UE, wherein the signal comprises a pilot signal. For example, the pilot signal analyzer 220 in this example may receive, via the receiver 214 from the UE, a signal comprising the pilot signal, or just the pilot signal. In one embodiment, the pilot signal occupies N symbol resources, where N is an integer larger than one, e.g. larger than 24. The pilot signal analyzer 220 may analyze the pilot signal to determine that the pilot signal includes at least one reference signal (RS) port that is determined from a predetermined pool of RS ports, where the predetermined pool includes at least N RS ports.

In one embodiment, the pilot signal includes W RS ports each of which is selected or determined independently from the predetermined pool of RS ports, where W is an integer larger than one, e.g. W=2, W=3, or W=4. In one embodiment, each of the RS ports in the predetermined pool has Nz non-zero elements, where Nz is an integer larger than 0 and less than 9, e.g. Nz=1, Nz=2, Nz=3, Nz=4, or Nz=6. In one embodiment, the Nz non-zero elements of each of the RS ports in the predetermined pool are adjacent in time and/or frequency domain.

In one embodiment, the predetermined pool of RS ports is at least one of: a pool of receive beam detection reference signal ports; and a pool of receive beam estimation reference signal ports. The signal may be received from the UE based on a contention-based grant free uplink transmission or a semi-persistent scheduling based grant-free uplink transmission.

In one embodiment, the predetermined pool has exactly N RS ports that are generated based on a plurality of orthogonal cover codes or a plurality of orthogonal sequences. In another embodiment, the predetermined pool has more than N RS ports that are generated based on a plurality of non-orthogonal sequences. In yet another embodiment, the predetermined pool has more than k*N RS ports that are generated based on a plurality of non-orthogonal sequences, wherein k=2, k=3, k=4, k=8, or k=16. In one embodiment, each of the RS ports in the predetermined pool has at most two non-zero elements, i.e. one non-zero element or two non-zero elements.

In one embodiment, the signal further comprises a data payload, wherein the data payload includes information related to the pilot signal including the at least one RS port.

The at least one RS port may be selected from the predetermined pool based on at least one bit in the data payload.

The channel estimator 222 may estimate one channel value of an entire transmission bandwidth experienced by signals transmitted by the UE based on the Nz non-zero elements of each of the RS ports in the predetermined pool. In one embodiment, the channel estimator 222 and the data payload analyzer 226 may perform a blind channel equalization based on the data payload; and the time frequency offset corrector 224 and the data payload analyzer 226 may perform a blind time frequency offset correction based on the data payload.

In one embodiment, the receive beamforming unit 228 may perform a receive beamforming based on the pilot signal; and the spatial combination unit 229 may perform a spatial combination based on the pilot signal to obtain a data signal. Then the channel estimator 222 may perform a channel estimation and compensation based on the data signal; and the time frequency offset corrector 224 may perform a time frequency offset estimation and compensation based on the data signal. The data payload analyzer 226 may then demodulate and analyze the data payload based on the compensated data signal.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the pilot signal analyzer 220. Conversely, each of the modules illustrated in FIG. 2 can be implemented using a plurality of separate components or elements.

Figure 3:
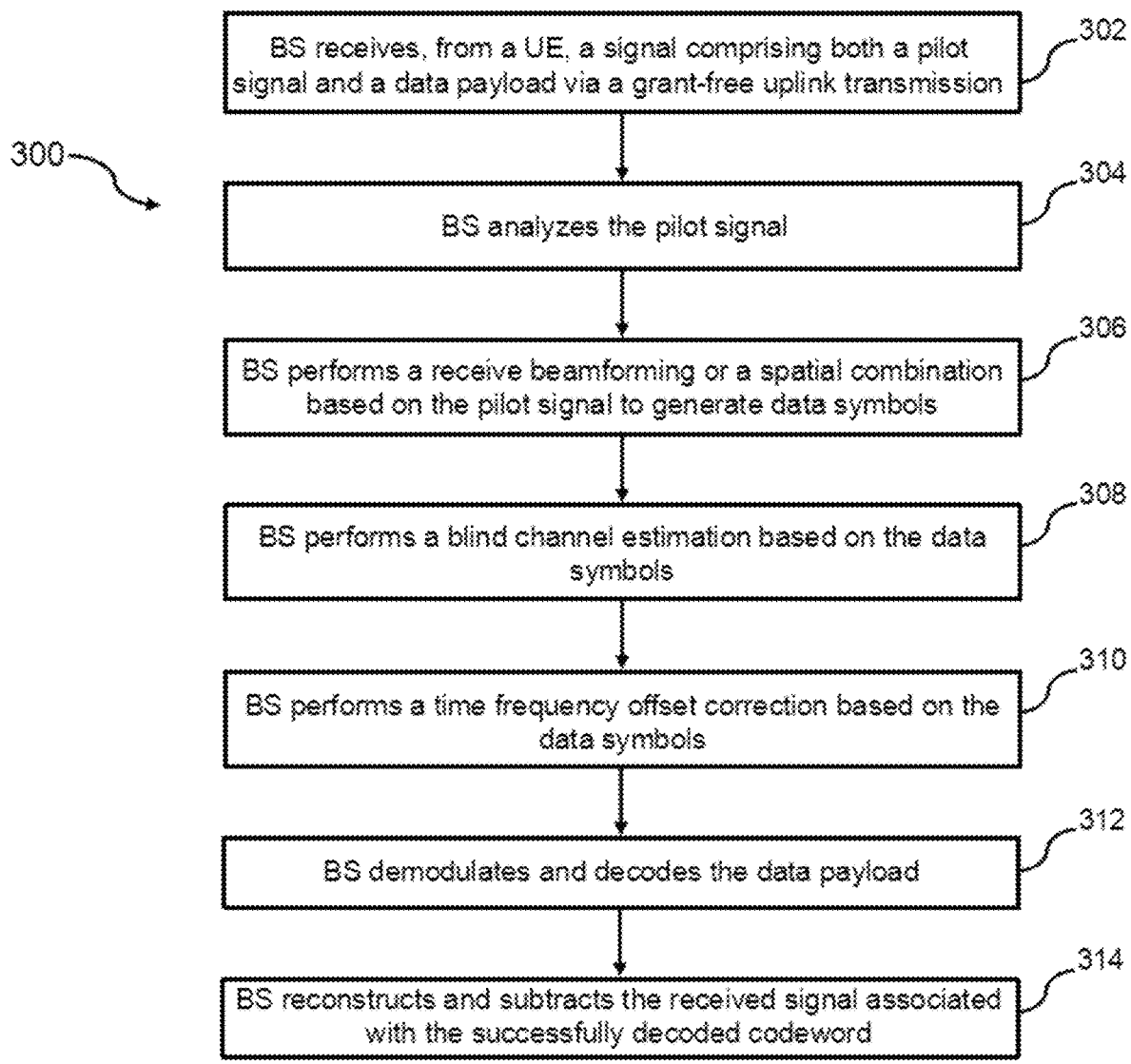
FIG. 3 illustrates a flow chart for a method performed by a BS, in accordance with some embodiments of the present disclosure.

FIG. 3 illustrates a flow chart for a method 300 performed by a BS, e.g. the BS 200 in FIG. 2, in accordance with some embodiments of the present disclosure. At operation 302, the BS receives, from a UE, a signal comprising both a pilot signal and a data payload via a grant-free uplink transmission. At operation 304, the BS analyzes the pilot signal. At operation 306, the BS performs a receive beamforming or a spatial combination based on the pilot signal to generate data symbols. At operation 308, the BS performs a blind channel estimation based on the data symbols. At operation 310, the BS performs a time frequency offset correction based on the data symbols. At operation 312, the BS demodulates and decodes the data payload. At operation 314, the BS reconstructs and subtracts the received signal associated with the successfully decoded codeword. The reconstruction of received signals including the reconstruction of data signal and pilot signal, which is based on the information included in the data payload and related to the pilot signal. After the reconstruction, the user's data and reference signals will be removed/subtracted from the received signal, and then the next round of multi-user detection is performed. The order of the steps shown in FIG. 3 may be changed according to different embodiments of the present disclosure.

Figure 4:
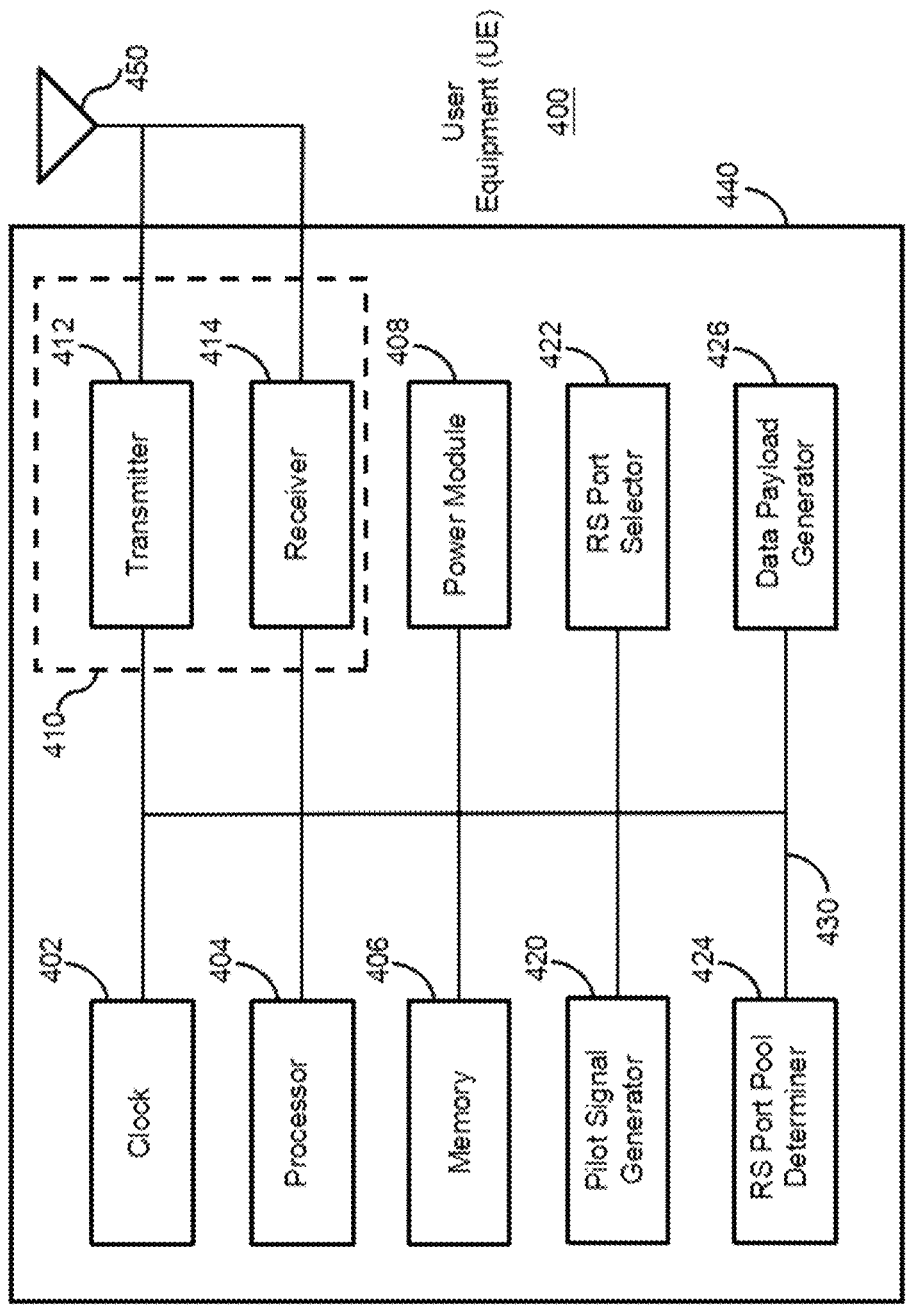
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a pilot signal generator 420, a RS port selector 422, a RS port pool determiner 424, and a data payload generator 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The pilot signal generator 420 in this example may generate a pilot signal, wherein the pilot signal includes at least one reference signal (RS) port that is determined from a predetermined pool of RS ports. In one embodiment, the predetermined pool includes at least N RS ports, wherein N is an integer larger than one, e.g. larger than 24. In one embodiment, the pilot signal occupies N symbol resources.

In one embodiment, the pilot signal includes W RS ports, where W is an integer larger than one, e.g. W=2, W=3, or W=4. The RS port selector 422 may select or determine each of the W RS ports independently from the predetermined pool of RS ports.

In one embodiment, the RS port pool determiner 424 may determine the pool of RS ports pre-defined by a protocol or standard. For example, each of the RS ports in the predetermined pool has Nz non-zero elements, where Nz is an integer larger than 0 and less than 9, e.g. Nz=1, Nz=2, Nz=3, Nz=4, or Nz=6. In one embodiment, the Nz non-zero elements of each of the RS ports in the predetermined pool are adjacent in time and/or frequency domain. In one embodiment, the Nz non-zero elements of each of the RS ports in the predetermined pool are used to estimate one channel value of an entire transmission bandwidth experienced by signals transmitted by the UE. In one embodiment, the predetermined pool of RS ports is at least one of: a pool of receive beam detection reference signal ports; and a pool of receive beam estimation reference signal ports.

In one embodiment, the predetermined pool has exactly N RS ports that are generated based on a plurality of orthogonal cover codes or a plurality of orthogonal sequences. In another embodiment, the predetermined pool has more than N RS ports that are generated based on a plurality of non-orthogonal sequences. In yet another embodiment, the predetermined pool has more than k*N RS ports that are generated based on a plurality of non-orthogonal sequences, wherein k=2, k=3, k=4, k=8, or k=16. In one embodiment, each of the RS ports in the predetermined pool has at most two non-zero elements, i.e. one non-zero element or two non-zero elements.

In one embodiment, the data payload generator 426 can generate a data payload that includes information related to the pilot signal including the at least one RS port. The data payload generator 426 may transmit, via the transmitter 412, a signal comprising the pilot signal and the data payload to a BS. The signal may be transmitted, via the transmitter 412 to the BS, based on a contention-based grant free uplink transmission or a semi-persistent scheduling based grant-free uplink transmission. In one embodiment, the at least one RS port may be selected by the RS port selector 422 from the predetermined pool based on at least one bit in the data payload.

In one embodiment, the data payload is utilized to perform a blind channel equalization and/or a blind time frequency offset correction at the BS. In another embodiment, the pilot signal is utilized to perform a receive beamforming or a spatial combination at the BS, before the data payload is demodulated.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the RS port selector 422. Conversely, each of the modules illustrated in FIG. 4 can be implemented using a plurality of separate components or elements.

Figure 5:
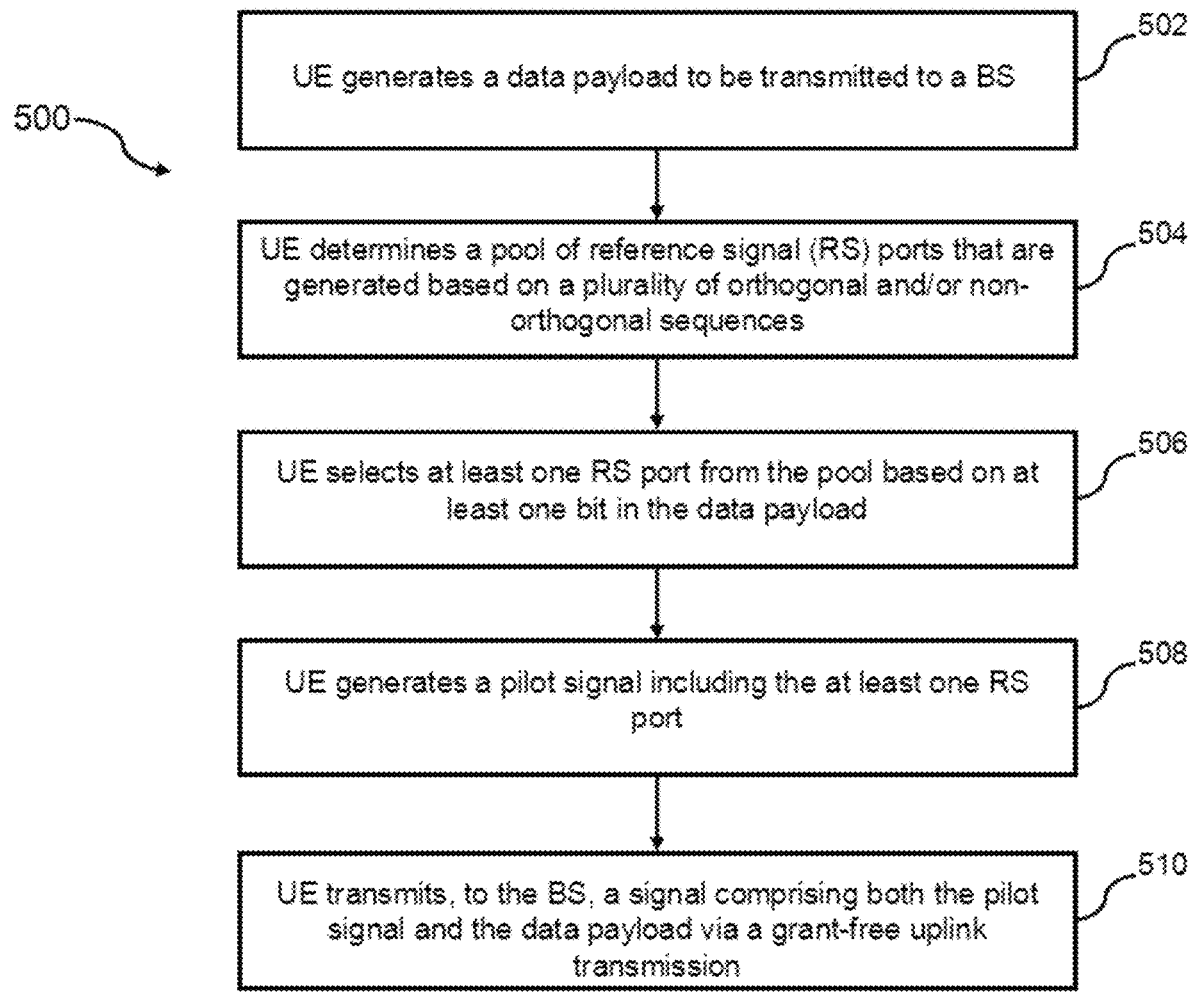
FIG. 5 illustrates a flow chart for a method performed by a UE, in accordance with some embodiments of the present disclosure.

FIG. 5 illustrates a flow chart for a method 500 performed by a UE, e.g. the UE 400 in FIG. 4, in accordance with some embodiments of the present disclosure. At operation 502, the UE generates a data payload to be transmitted to a BS. The UE determines at operation 504 a pool of reference signal (RS) ports that are generated based on a plurality of orthogonal and/or non-orthogonal sequences. At operation 506, the UE selects at least one RS port from the pool based on at least one bit in the data payload. At operation 508, the UE generates a pilot signal including the at least one RS port. At operation 510, the UE transmits, to the BS, a signal comprising both the pilot signal and the data payload via a grant-free uplink transmission. The order of the steps shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

One main purpose of the embodiments is to greatly lighten the task of the reference signals, such that each reference signal occupies a minimal resource, or say each reference signal may be most sparse to achieve a maximum number of reference signals in a pool. This enables both the semi-persistent scheduling based grant-free and contention-based grant-free transmissions to support more users.

In one embodiment, the disclosed system utilizes advanced data-based channel estimation technology (rather than based on reference signals) to estimate the channel of the entire transmission bandwidth and the time-frequency offset by the characteristics of the data itself, e.g. based on a simple geometric property of a constellation shape of a low-order modulated data symbol, like a binary phase shift keying (BPSK) or quadrature phase shift keying (QPSK) data symbol. That is, it is no longer needed to estimate the channel on the entire transmission bandwidth and the time-frequency offset based the reference signal. Therefore, the task of the reference signal in the present teaching is much smaller than that in a traditional method. Therefore, each reference signal occupies much less resources than that in a traditional system. Therefore, under a certain reference signal overhead, the number of the reference signals of the present teaching is much larger than that in the traditional system.

On the other hand, when the base station has multiple receiving antennas, it can theoretically provide a very strong spatial capability to improve the performance of multi-user access. In order to obtain this spatial capability, the present teaching proposes an "extremely sparse" reference signal that can be used to estimate the spatial domain channel, $h_k=[h_{k1}, h_{k2} \ldots h_{kR}]^t$, of each access user, where t is transpose operator. These estimated spatial channel vectors are then used to spatially combine the received signals. Specifically, the user k's signals are combined to do spatial combination by: $s_k=w_k^*y$, where, $y=[y_{k1}, y_{k2} \ldots y_{kR}]^t$ represents received signals of R receive antennas, and $w_k=h_k'$ if maximal ratio combining (MRC) is used, or $w_k=h_k'(HH'+\sigma^2I)^{-1}$ if minimum mean square error (MMSE) based spatially combining is used, where $h_k'$ is the conjugate transpose of $h_k$, H is a matrix composed of the spatial channel vectors of all detected users, $\sigma$ is the mean square deviation of the additive white Gaussian noise (AWGN), and I is a R*R unit matrix. Then the receiver may use the spatially combined data symbol $s_k$ to estimate the channel on the entire transmission bandwidth experienced by user k's signal and its corresponding time-frequency offset. Then a channel equalization and a time-frequency offset compensation are performed with respect to the spatially combined data symbol $s_k$. Then, the receiver can demodulate and decode the data symbols after the compensation of channel and time-frequency offset.

The reference signal, which is a pilot signal in the present teaching, is merely used for spatial combination, but not used for channel equalization or demodulation. On the other hand, spatial combination is of the same function as receive beamforming. As such, the reference signal may be considered as a spatial combination reference signal (SCRS), or a receive beamforming reference signal (RBRS), or a receive beam detection reference signal (RBDRS).

Figure 6:
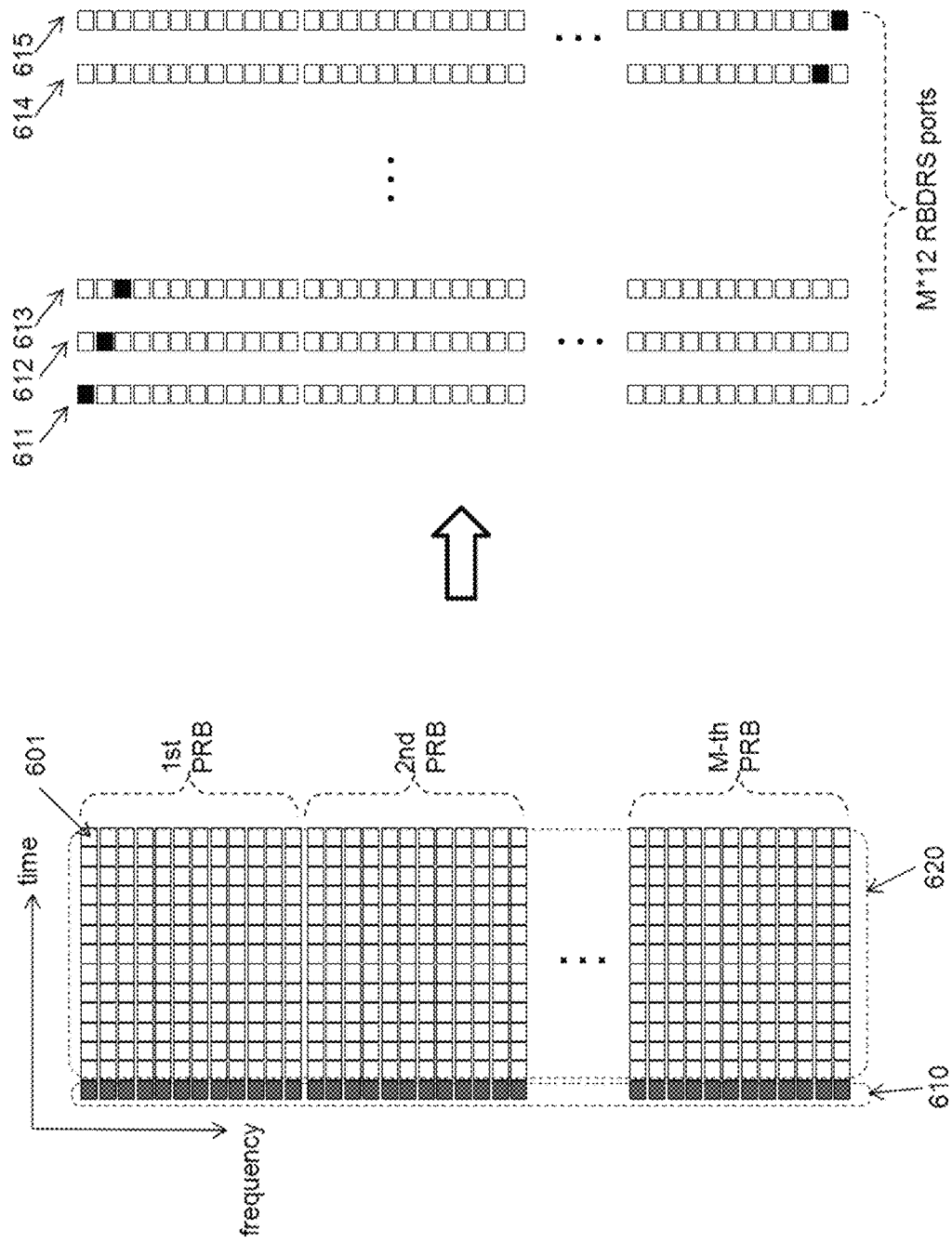
FIG. 6 illustrates an exemplary pool of reference signal ports for a transmission including M physical resource blocks (PRBs), in accordance with some embodiments of the present disclosure.

Therefore, in a disclosed embodiment of the present teaching, there is no need to use a reference signal (RS) to estimate the channel over the entire transmission bandwidth, or to estimate the time-frequency offset. Therefore, the reference signal proposed in the present teaching is extremely sparse. An example is shown in FIG. 6, where a reference signal may be referred to as a reference signal port, or RBDRS port. FIG. 6 illustrates an exemplary pool of reference signal ports for a transmission including M physical resource blocks (PRBs), in accordance with some embodiments of the present disclosure. As shown in FIG. 6, a transmission comprises M PRBs of time-frequency resources, where each PRB comprises: 14 orthogonal frequency division multiplexing (OFDM) symbols (or DFT-S-OFDM or SC-FDMA symbols) at the time domain, and 12 subcarriers at the frequency domain. As shown in FIG. 6, each small grid 601 is a subcarrier of an OFDM (or DFT-S-OFDM or SC-FDMA) symbol, which is also commonly referred to as a resource element (RE). In other words, a PRB, like the one shown in FIG. 6 contains a total of 12*14=168 REs. In each PRB or each transmission, 1/14 of the transmission resources is used for transmitting reference signals. That is, M*12 REs are used for transmitting reference signals. As shown in FIG. 6, the data payload 620 occupies the rest RE resources. However, each reference signal defined by the system only has one non-zero symbol (non-zero signal, or useful signal) on one RE, and there is no signal in the remaining resources (or say the value is 0 in other resources), which is an extremely sparse reference signal or a most sparse reference signal, as no other type of reference signal can be more sparse than it. As such, the reference signal area 610 accounts for a ¹/₁₄ overhead of the transmission, and may be divided into a total of M*12 reference signal ports or RBDRS ports. In one embodiment, where there are M=6 PRBs, with a ¹/₁₄ overhead, there will be 6*12=72 reference signals in total in the RS pool, which is much greater than 8 or 12 reference signals in a pool of an existing NR system.

As shown in FIG. 6, different RBDRS ports 611, 612, 613, 614, 615 in the RS pool have the non-zero symbol on different RE positions. For example, the first RBDRS port 611 has one non-zero symbol carried on the first RE of the reference signal area 610, with value 0 in all other REs; the second RBDRS port 612 has one non-zero symbol carried on the second RE of the reference signal area 610, with value 0 in all other REs; . . . the M*12-th RBDRS port 615 has one non-zero symbol carried on the M*12-th RE of the reference signal area 610, with value 0 in all other REs.

In this case, each pilot signal including a corresponding one of the RBDRS ports occupies N symbol resources or REs. This is because, when a user transmits a pilot signal and a data symbol in a transmission. Although some of the RBDRS of the pilot signal have a value of 0, these 0-value places cannot be used for transmitting data symbols or data payload. The data payload is transmitted through data symbols. In one embodiment, the receiver will perform blind detection using the data symbols. Each transmission includes a pilot signal and data payload (or data symbols). As such, the symbol resources used to transmit the pilot signal in FIG. 6 are M*12, or the resource overhead is M*12 symbol resources or REs for transmitting the pilot signal.

Similar to FIG. 6, FIG. 7 to FIG. 11 show different forms of most sparse RBDRS, under a ¹/₁₄ reference signal overhead. As shown in FIG. 7 to FIG. 11, there are M number of PRBs, with a same definition of PRBs in FIG. 6, such that there are a total of M*12 RBDRS ports in the RBDRS pool.

Figure 7:
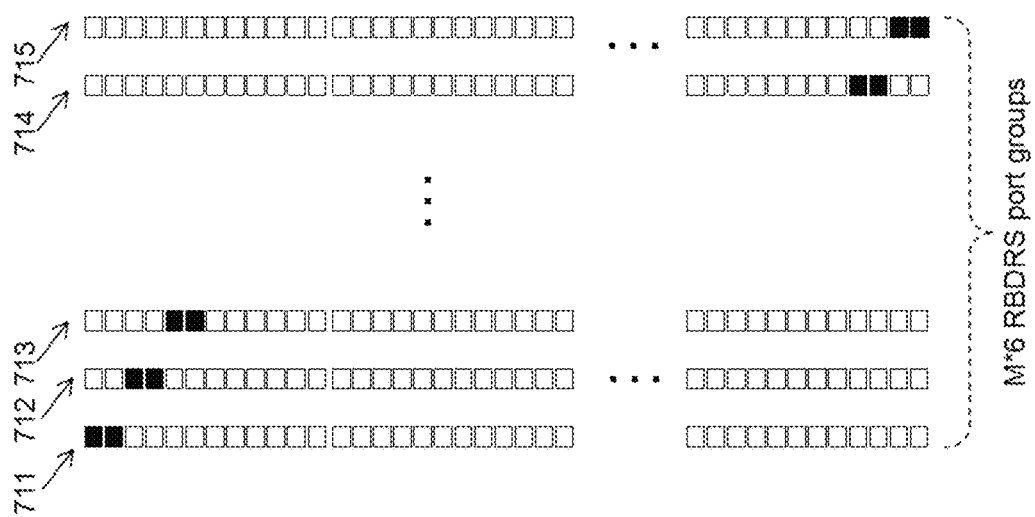
FIG. 7 illustrates another exemplary pool of reference signal ports for a transmission including M PRBs, in accordance with some embodiments of the present disclosure.

As shown in FIG. 7, the RBDRS pool includes M*6 RBDRS port groups, where each RBDRS port group includes two RBDRS ports and the non-zero elements of them occupy the same two REs. For simplicity of expression, a reference signal carried on a plurality of adjacent or contiguous REs in the time and frequency domains is referred to as a reference signal unit (RSU). In FIG. 7, the reference signal carried on two consecutive REs in the frequency domain is called a RSU.

Figure 8:
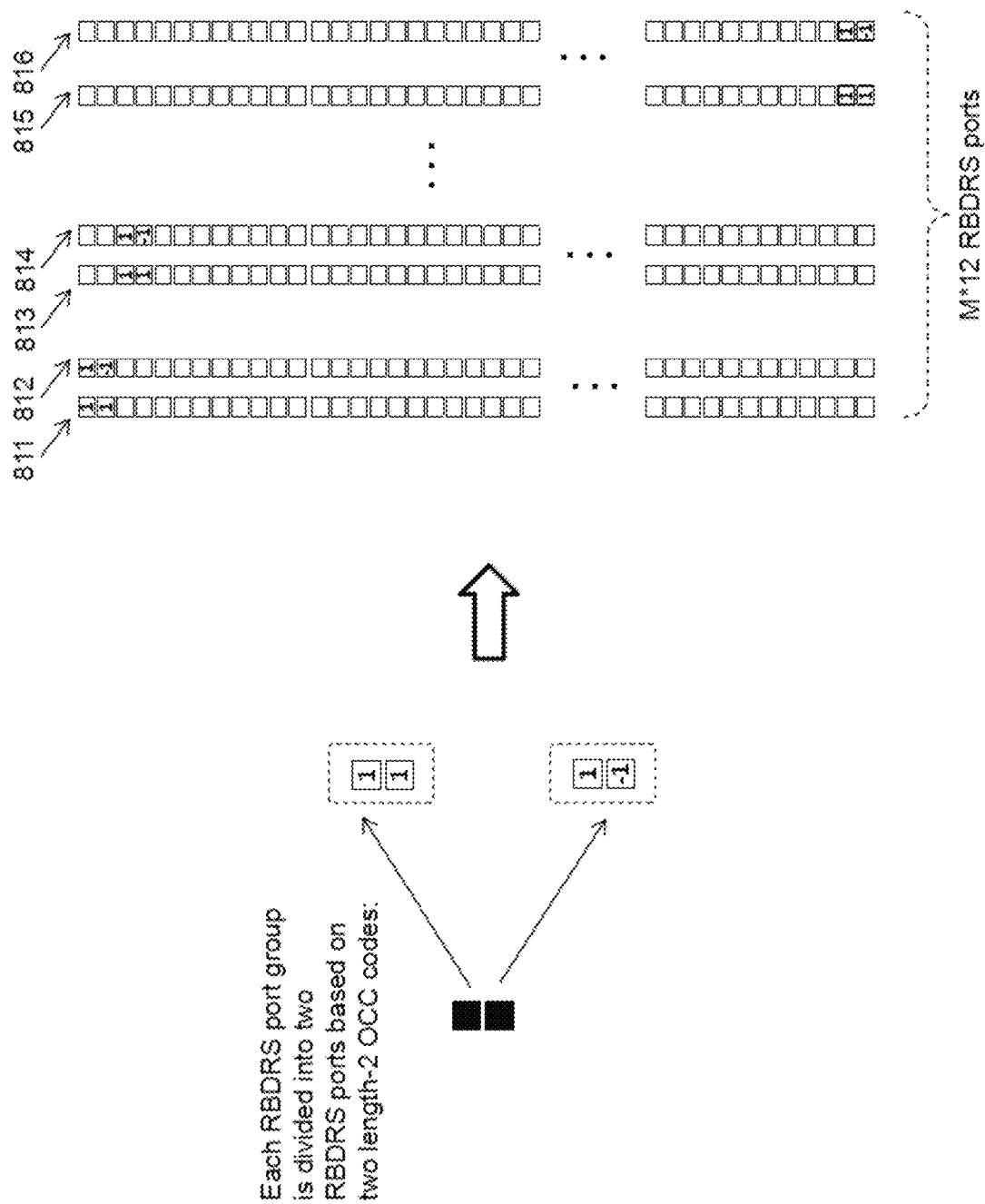
FIG. 8 illustrates an exemplary pool of reference signal ports generated based on orthogonal cover codes (OCCs), in accordance with some embodiments of the present disclosure.
Figure 9:
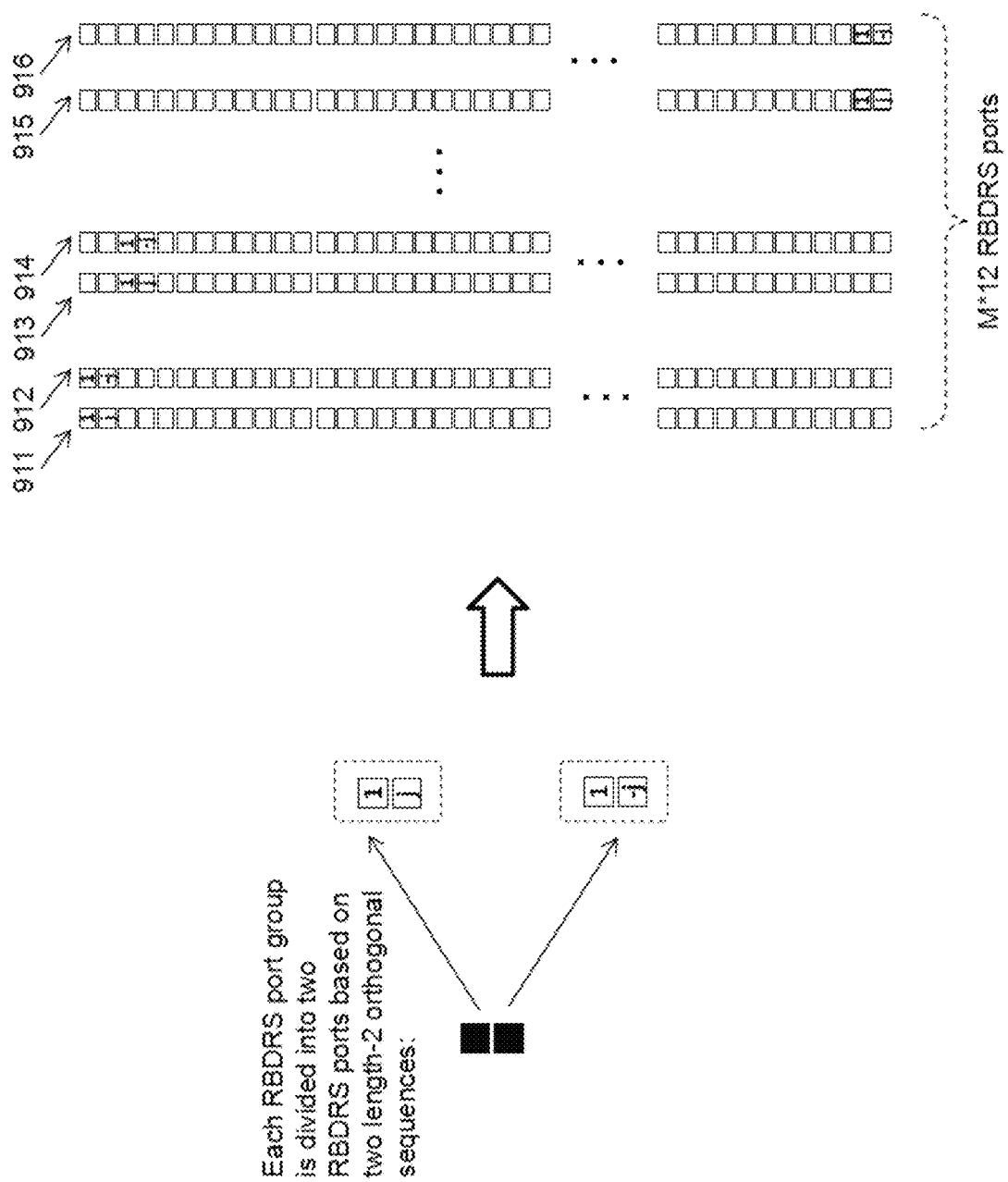
FIG. 9 illustrates an exemplary pool of reference signal ports generated based on orthogonal sequences, in accordance with some embodiments of the present disclosure.

Non-zero symbols of each RBDRS port group are carried on the same REs, and different reference signals in the same group can only be distinguished by non-zero symbols of different values. For example, FIG. 8 shows that different length-2 frequency domain orthogonal cover codes (OCCs) are used to distinguish different reference signal ports in a same group. As such, each of the M*6 RBDRS port groups is divided to two different RBDRS ports. For example, RBDRS port group 711 is divided into two RBDRS ports 811, 812, based on two different OCC codes. As such, M*12 RBDRS ports are included in the RBDRS port pool in FIG. 8. Similarly in FIG. 9, different length-2 orthogonal sequences are used to distinguish different reference signal ports in a same group. As such, each of the M*6 RBDRS port groups is divided to two different RBDRS ports. For example, RBDRS port group 711 is divided into two RBDRS ports 911, 912, based on two different orthogonal sequences. As such, M*12 RBDRS ports are included in the RBDRS port pool in FIG. 9.

Figure 10:
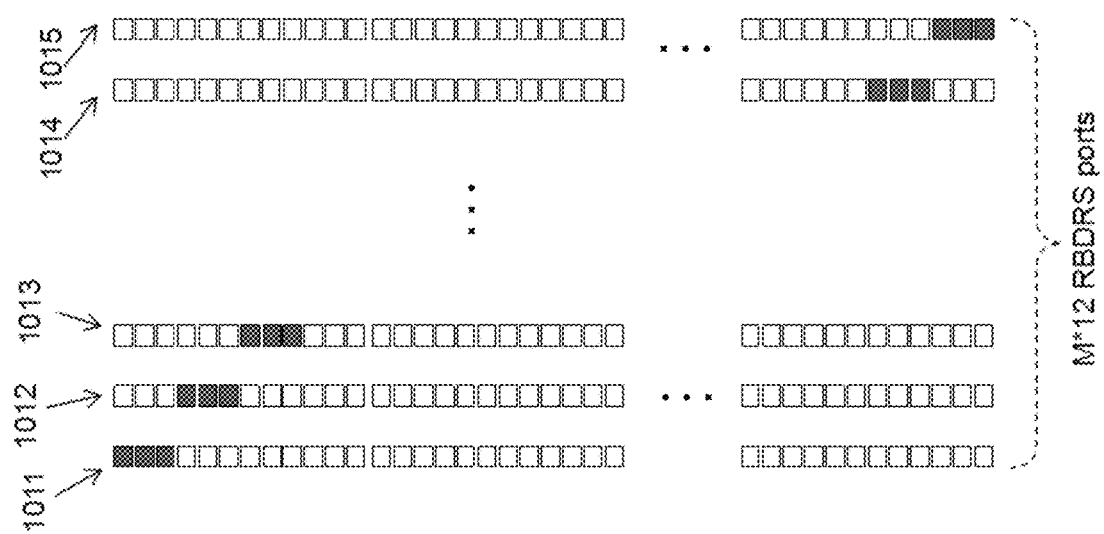
FIG. 10 illustrates yet another exemplary pool of reference signal ports for a transmission including M PRBs, in accordance with some embodiments of the present disclosure.
Figure 11:
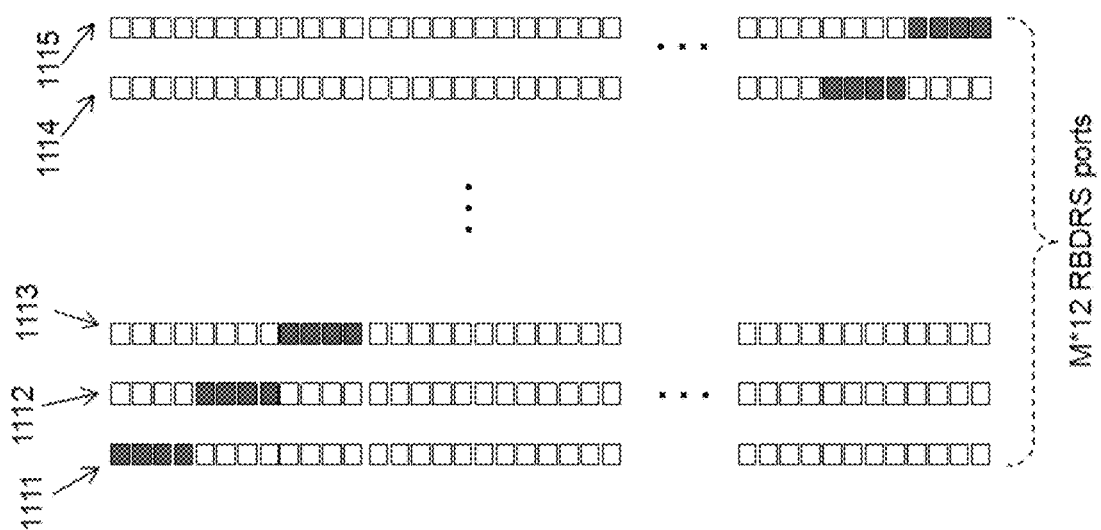
FIG. 11 illustrates still another exemplary pool of reference signal ports for a transmission including M PRBs, in accordance with some embodiments of the present disclosure.

FIG. 10 illustrates yet another exemplary pool of reference signal ports for a transmission including M PRBs, where M*12 RBDRS ports are grouped into different groups each of which have three non-zero symbols on three adjacent or contiguous RE positions. FIG. 11 illustrates still another exemplary pool of reference signal ports for a transmission including M PRBs, where M*12 RBDRS ports are grouped into different groups each of which have four adjacent or contiguous non-zero symbols on four RE positions. In both FIG. 10 and FIG. 11, OCCs or orthogonal sequences may be used to distinguish different RBDRS ports in a same group.

FIG. 12 to FIG. 19 show different forms of the most sparse RBDRS signals under a larger reference signal overhead, which is a ¹/₇ overhead. There are M*24 RBDRS ports in the reference signal pool. Specifically, when there are M=6 PRBs with a ¹/₇ overhead, there will be 24*6=144 reference signals. This can support 144 semi-persistent scheduling based grant-free users, and can support more contention-based grant free users compared to an existing system with only 12 or 8 reference signals, since the probability for any two contention-based grant free users to have a reference signal collision is ¹/₁₄₄, far below the ¹/₁₂ probability in an existing system.

Figure 12:
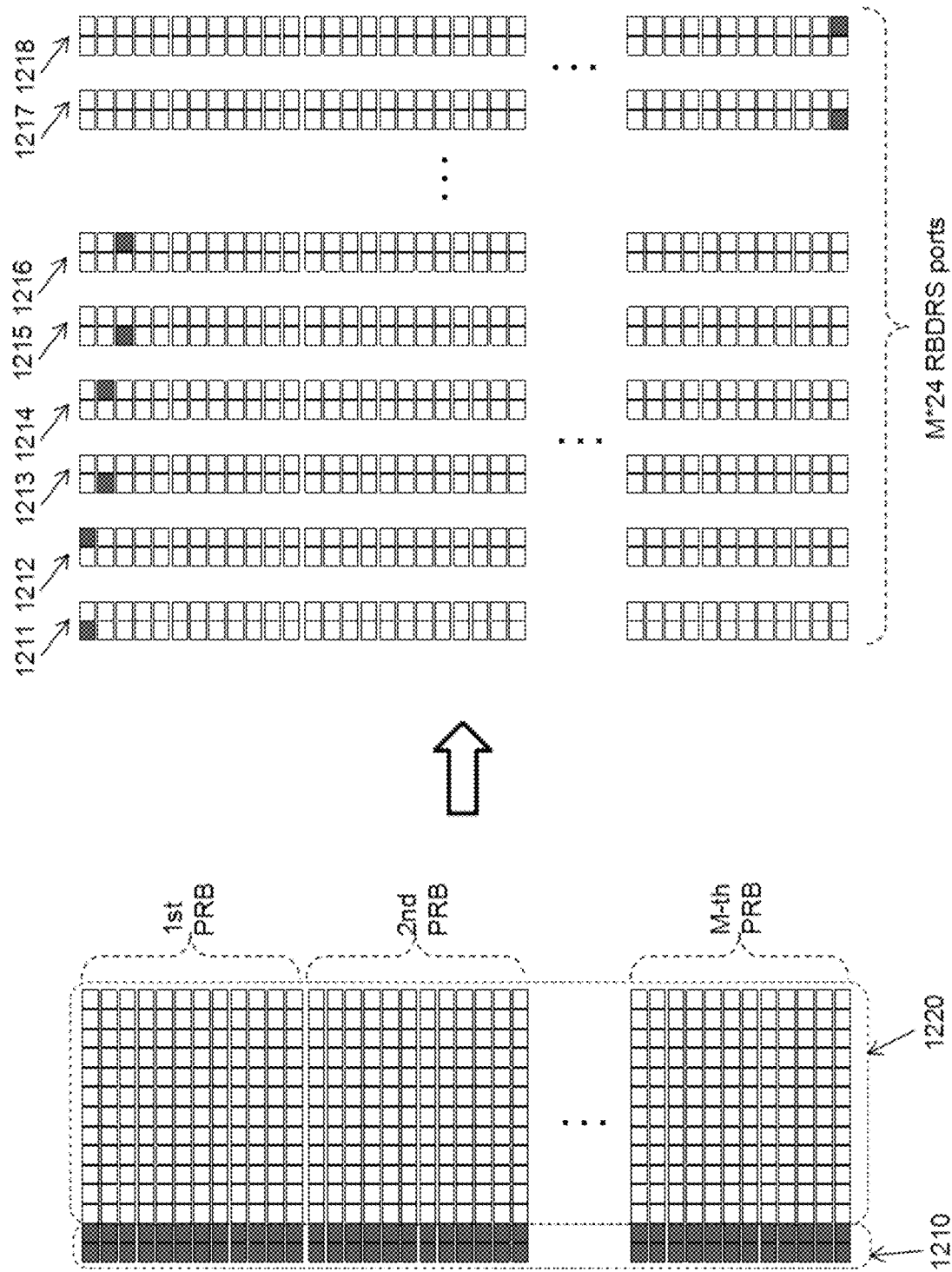
FIG. 12 illustrates an exemplary pool of reference signal ports for a transmission with M PRBs and $1/7$ reference signal overhead, in accordance with some embodiments of the present disclosure.

As shown in FIG. 12, a RBDRS port is defined such that the first two OFDM symbols are used to carry a RBDRS signal, i.e., the first two OFDM symbols are a reference signal area or reference signal region 1210, which occupies a ¹/₇ resource overhead of the transmission resources. The remaining resources 1220 may be used to transmit data payload. Each RBDRS port in FIG. 12 have only one non-zero symbol on one RE, with no signal or with value 0 in all other REs. Different RBDRS ports 1211, 1212, . . . 1218 in the RBDRS pool have the non-zero symbol on different RE positions.

Figure 13:
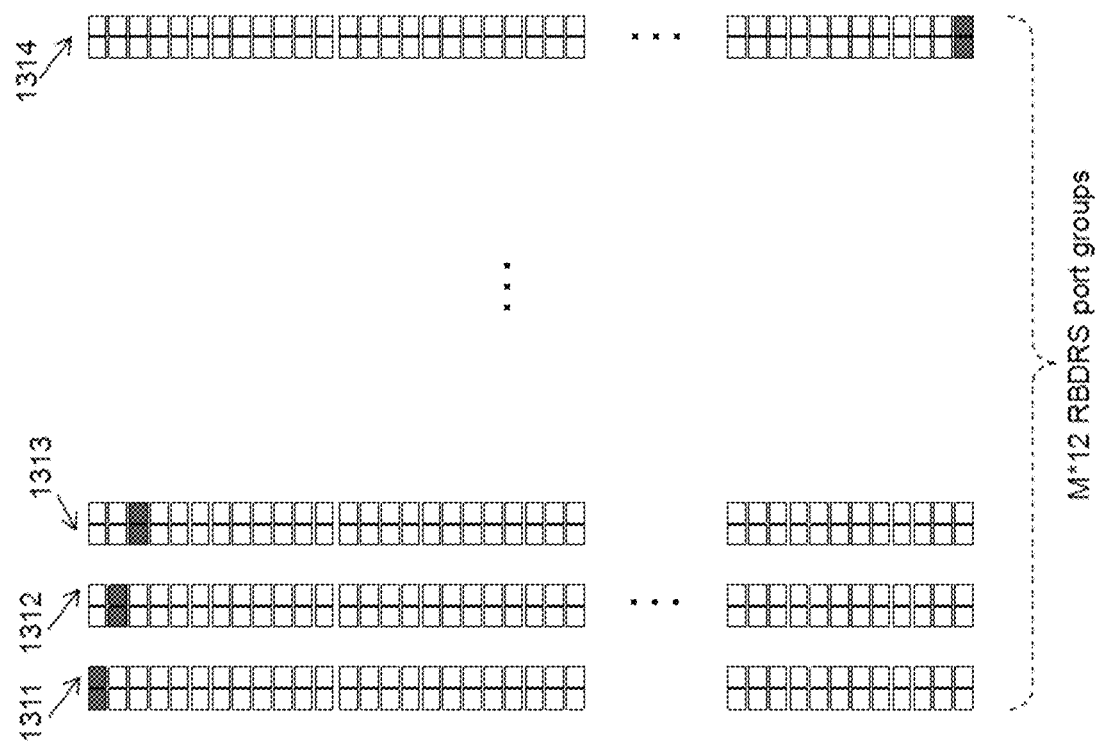
FIG. 13 illustrates another exemplary pool of reference signal ports for a transmission with M PRBs and $1/7$ reference signal overhead, in accordance with some embodiments of the present disclosure.
Figure 14:
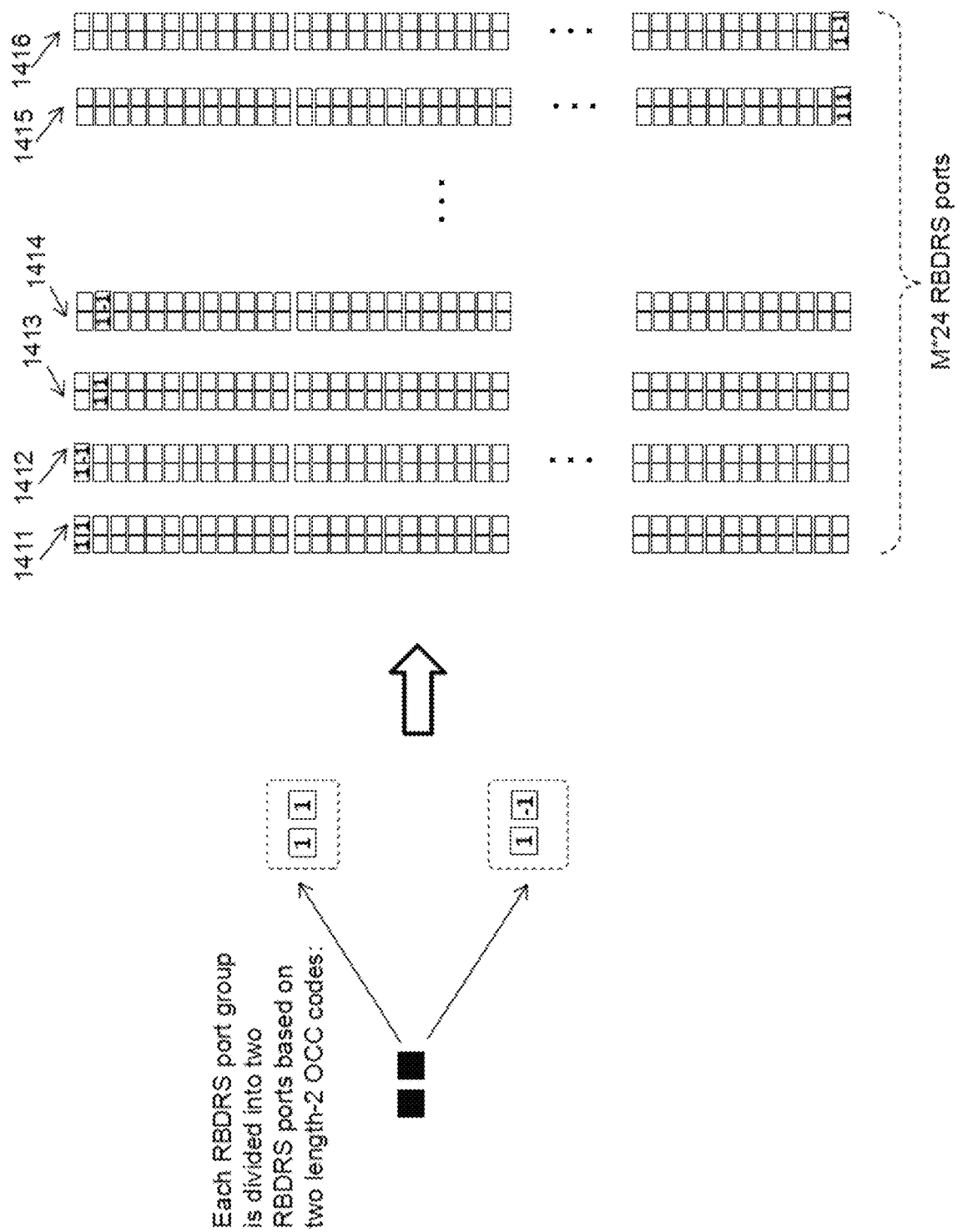
FIG. 14 illustrates an exemplary pool of reference signal ports generated based on OCCs for a transmission with M PRBs and $1/7$ reference signal overhead, in accordance with some embodiments of the present disclosure.
Figure 15:
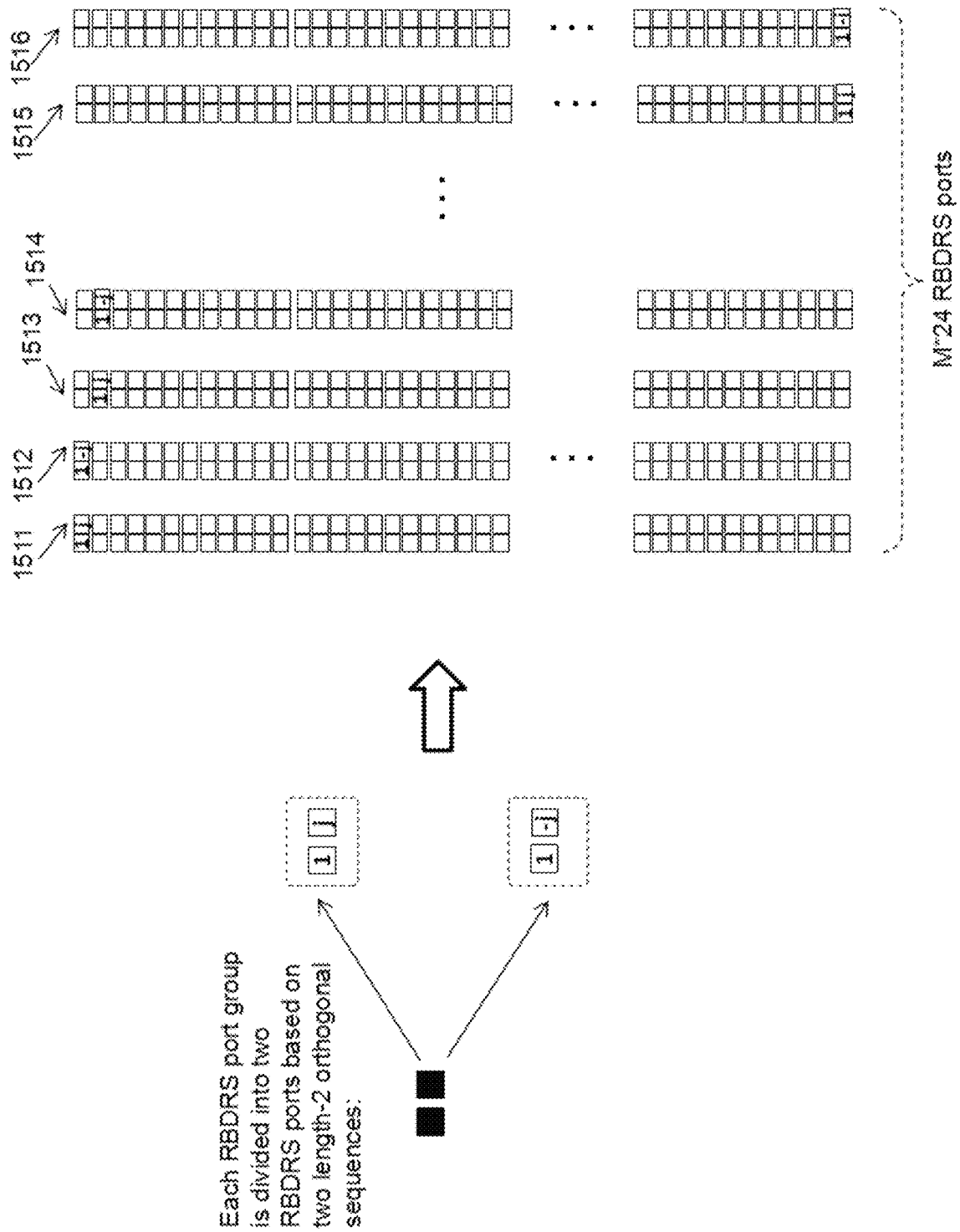
FIG. 15 illustrates an exemplary pool of reference signal ports generated based on orthogonal sequences for a transmission with M PRBs and $1/7$ reference signal overhead, in accordance with some embodiments of the present disclosure.

As shown in FIG. 13, the RBDRS pool includes M*12 RBDRS port groups, where each RBDRS port group includes two consecutive REs in the time domain. Non-zero symbols of each RBDRS port group are carried on the same REs, and different reference signals in the same group may be distinguished by non-zero symbols of different values. For example, FIG. 14 shows that different length-2 time domain orthogonal cover codes (OCCs) are used to distinguish different reference signal ports in a same group. As such, each of the M*12 RBDRS port groups is divided to two different RBDRS ports. For example, RBDRS port group 1311 is divided into two RBDRS ports 1411, 1412, based on two different OCC codes, i.e., [1, 1] and [1, −1]. As such, M*24 RBDRS ports are included in the RBDRS port pool in FIG. 14. Similarly in FIG. 15, different length-2 orthogonal sequences, i.e., [1, j] and [1, −j] are used to distinguish different reference signal ports in a same group. As such, each of the M*12 RBDRS port groups is divided to two different RBDRS ports. For example, RBDRS port group 1311 is divided into two RBDRS ports 1511, 1512, based on two different orthogonal sequences. As such, M*24 RBDRS ports are included in the RBDRS port pool in FIG. 15.

Figure 16:
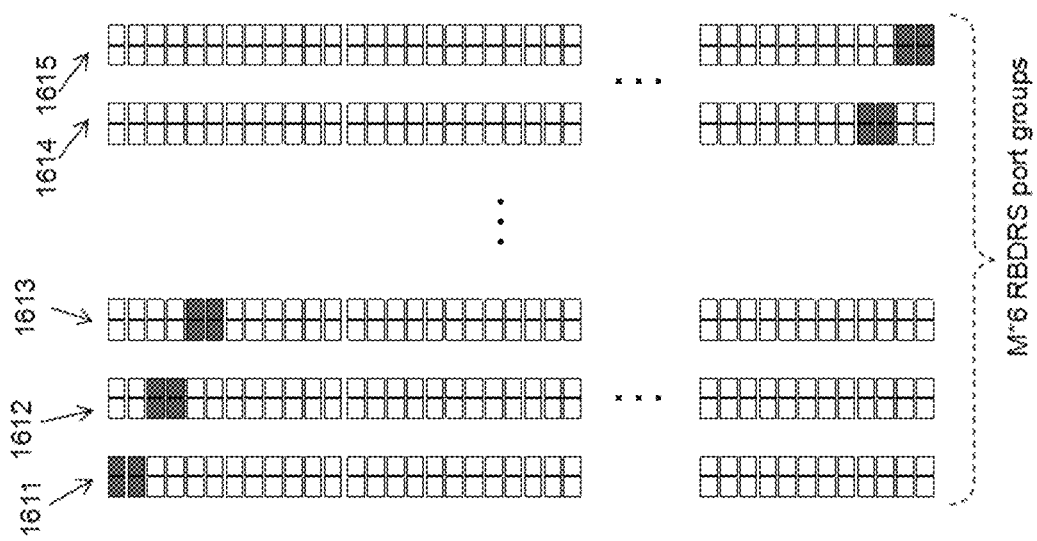
FIG. 16 illustrates yet another exemplary pool of reference signal ports for a transmission with M PRBs and $1/7$ reference signal overhead, in accordance with some embodiments of the present disclosure.
Figure 17:
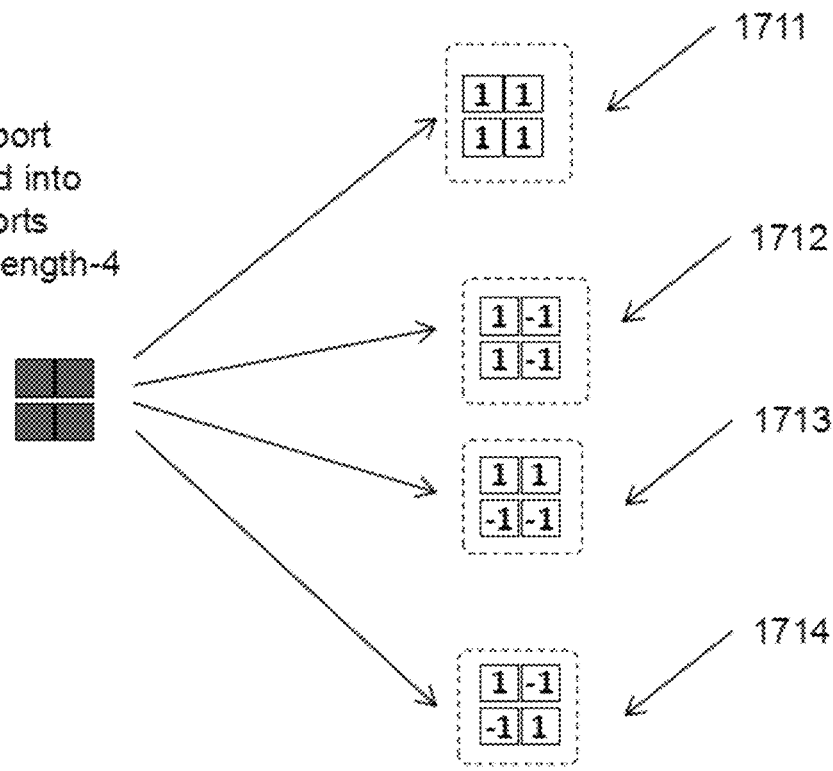
FIG. 17 illustrates four exemplary OCCs for generating a pool of reference signal ports, in accordance with some embodiments of the present disclosure.
Figure 18:
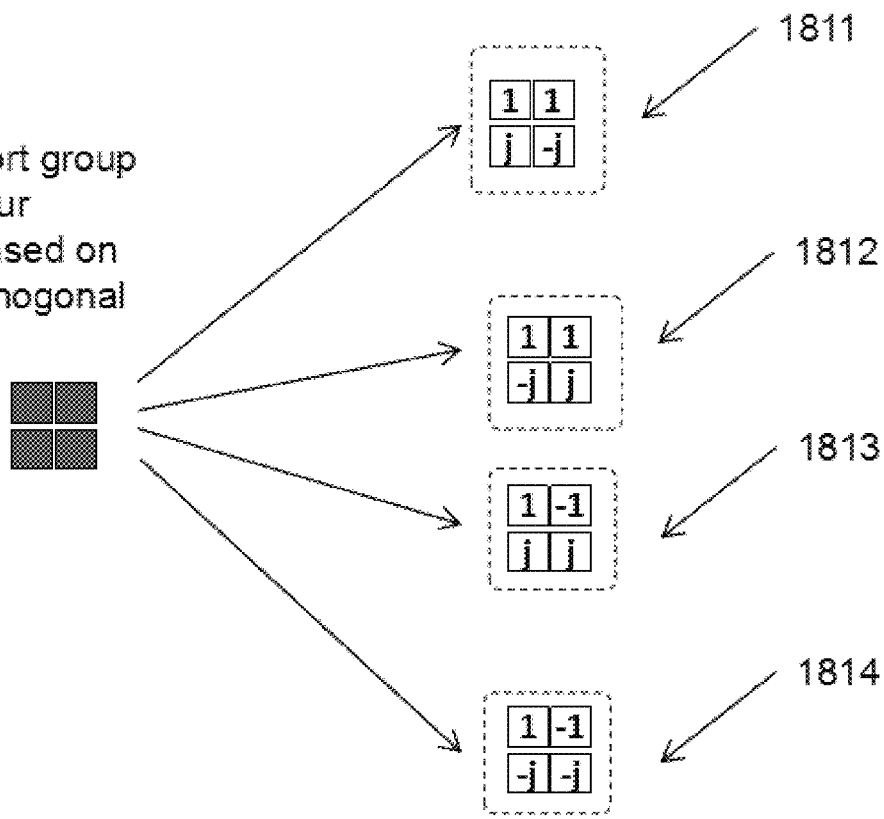
FIG. 18 illustrates four exemplary orthogonal sequences for generating a pool of reference signal ports, in accordance with some embodiments of the present disclosure.
Figure 20:
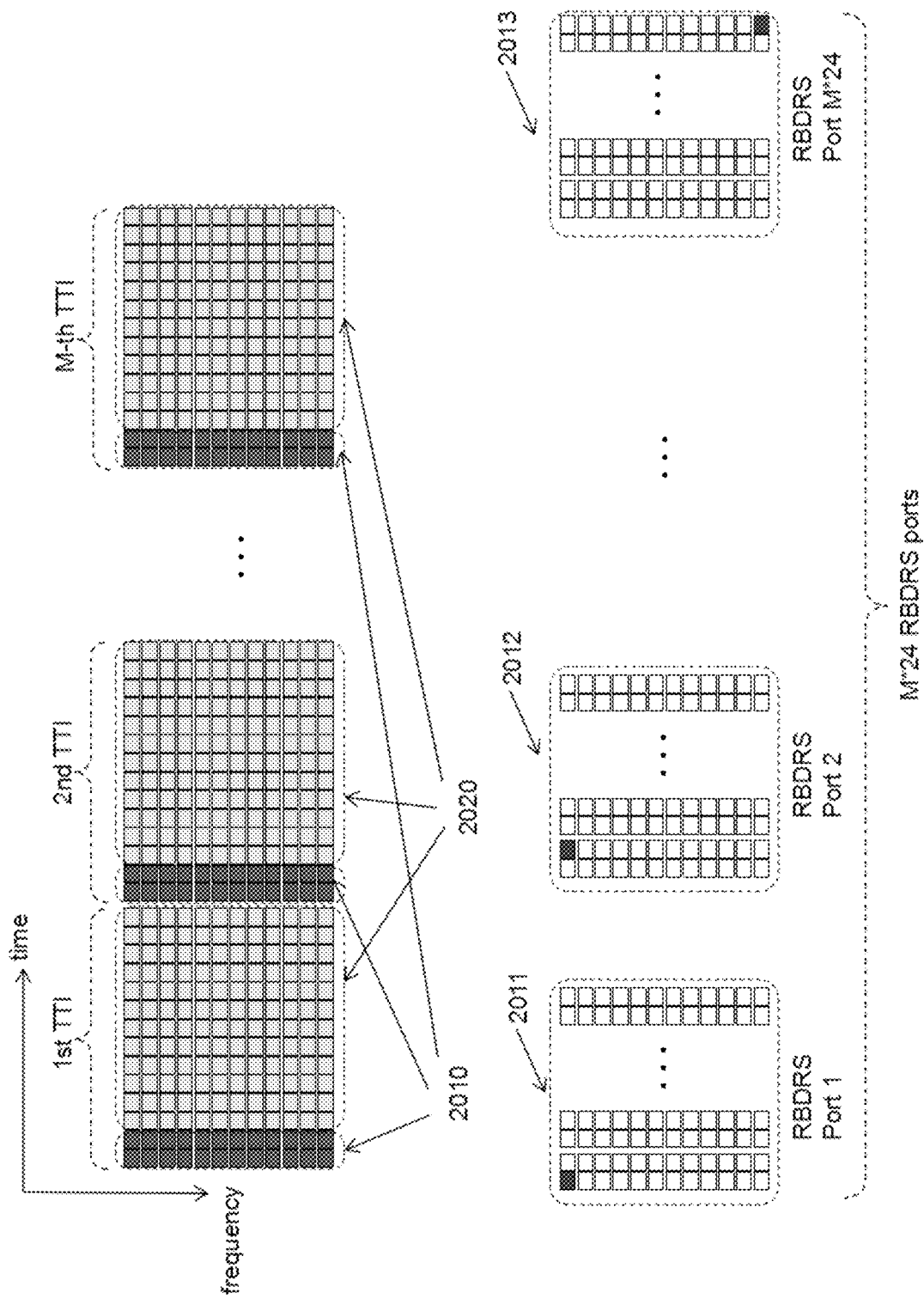
FIG. 20 illustrates an exemplary pool of reference signal ports for a transmission including one PRB and M transmission time intervals (TTIs), in accordance with some embodiments of the present disclosure.
Figure 21:
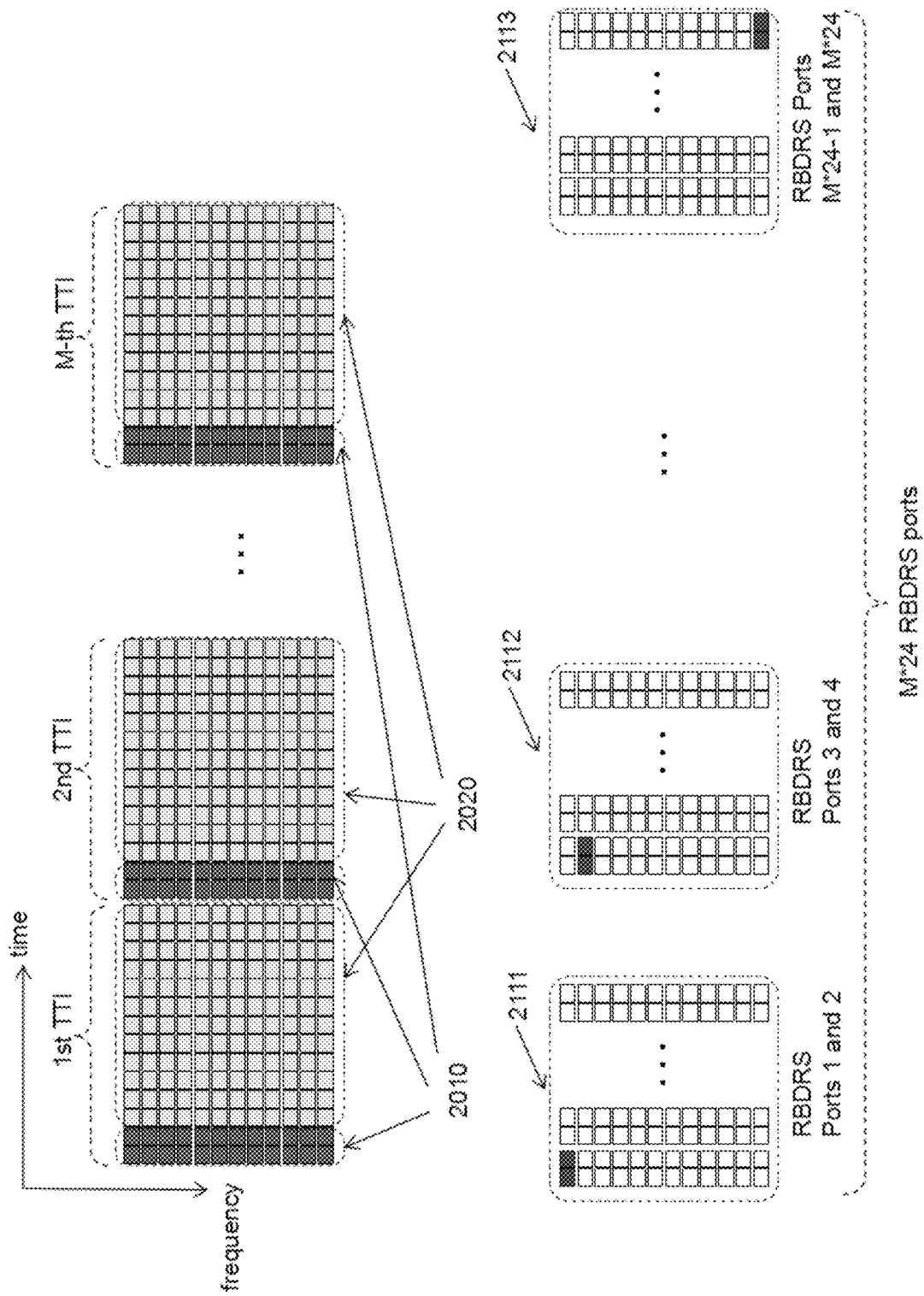
FIG. 21 illustrates another exemplary pool of reference signal ports for a transmission including one PRB and M TTIs, in accordance with some embodiments of the present disclosure.
Figure 22:
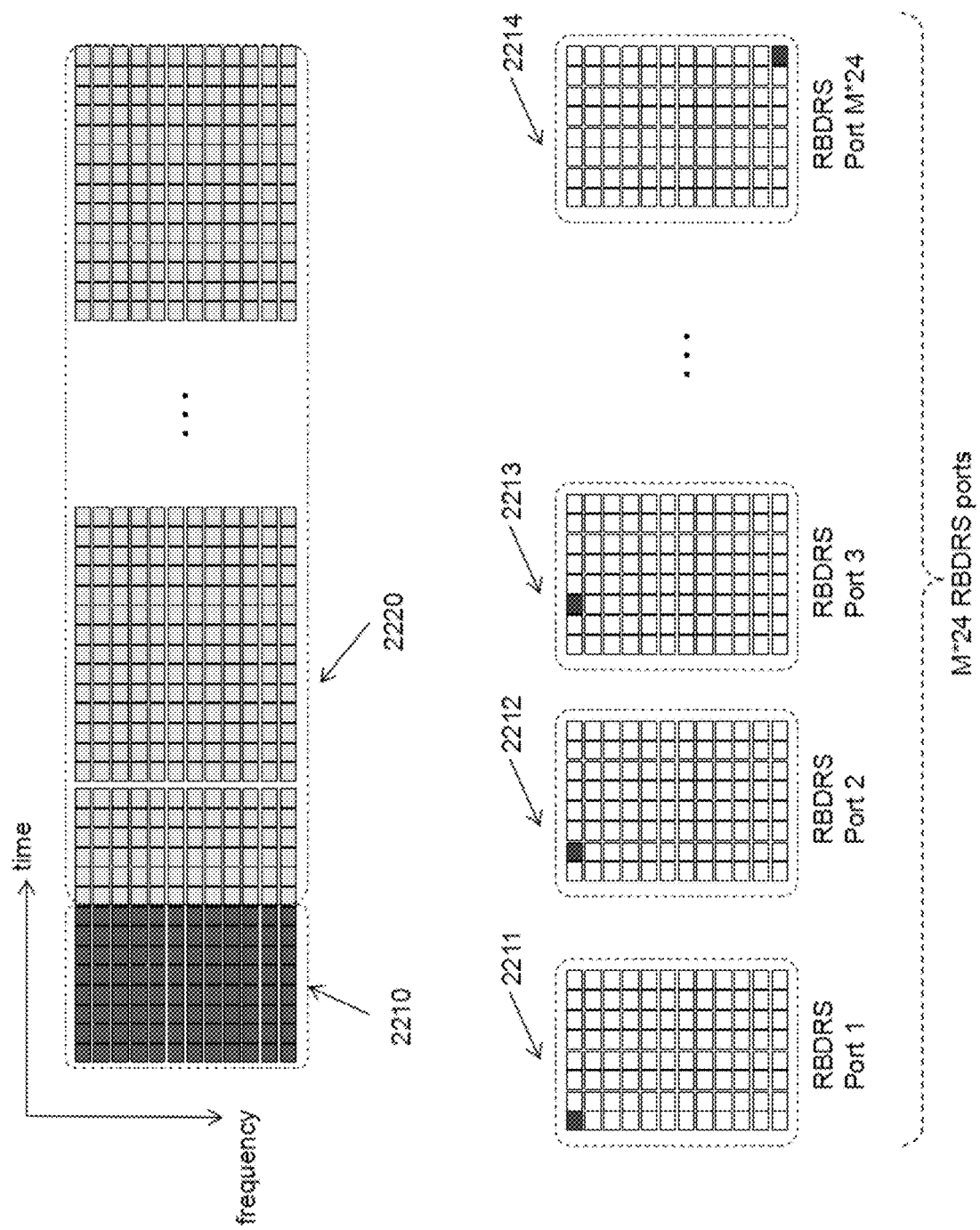
FIG. 22 illustrates an exemplary pool of reference signal ports for a transmission with a reference signal region at beginning symbols, in accordance with some embodiments of the present disclosure.
Figure 23:
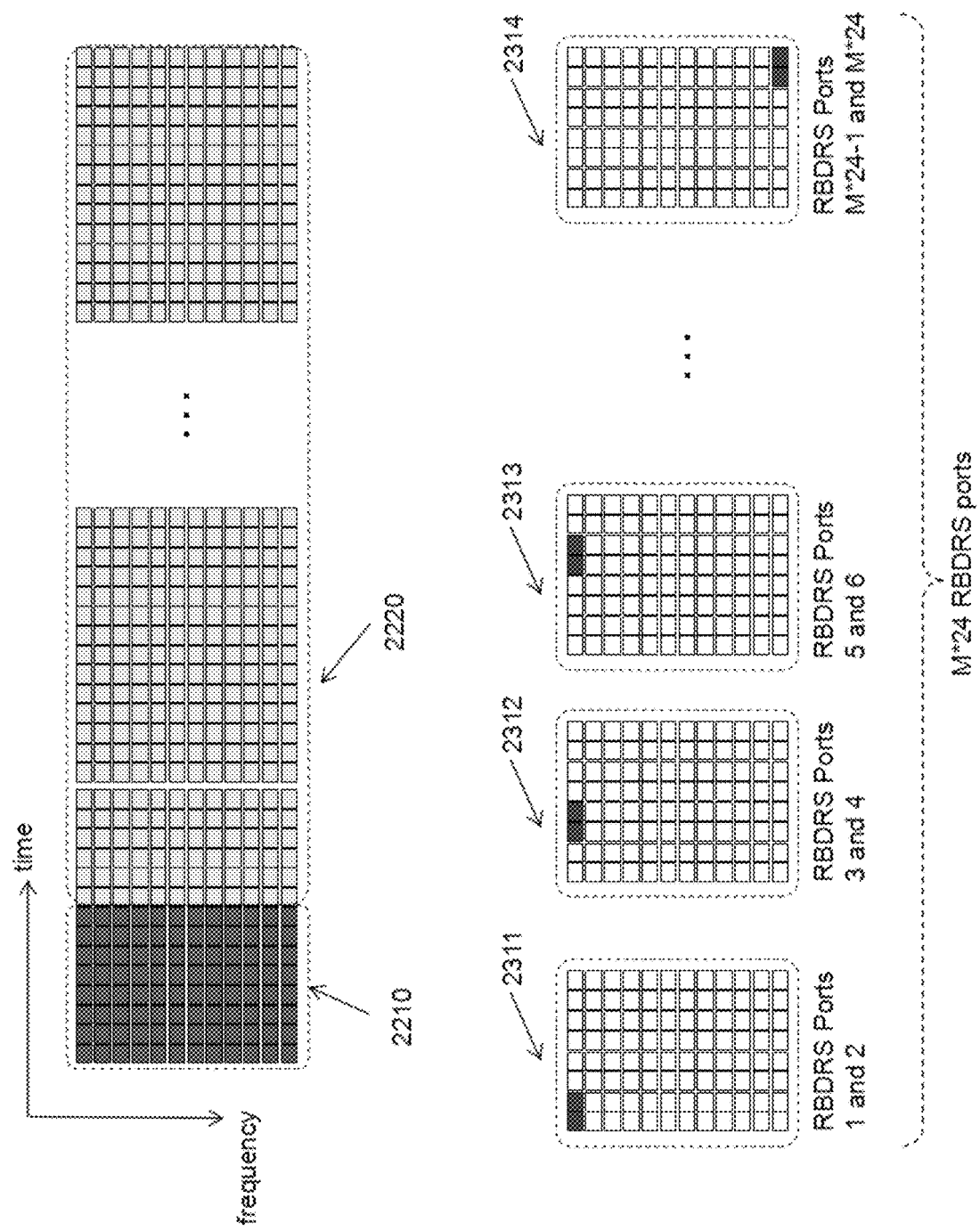
FIG. 23 illustrates another exemplary pool of reference signal ports for a transmission with a reference signal region at beginning symbols, in accordance with some embodiments of the present disclosure.
Figure 24:
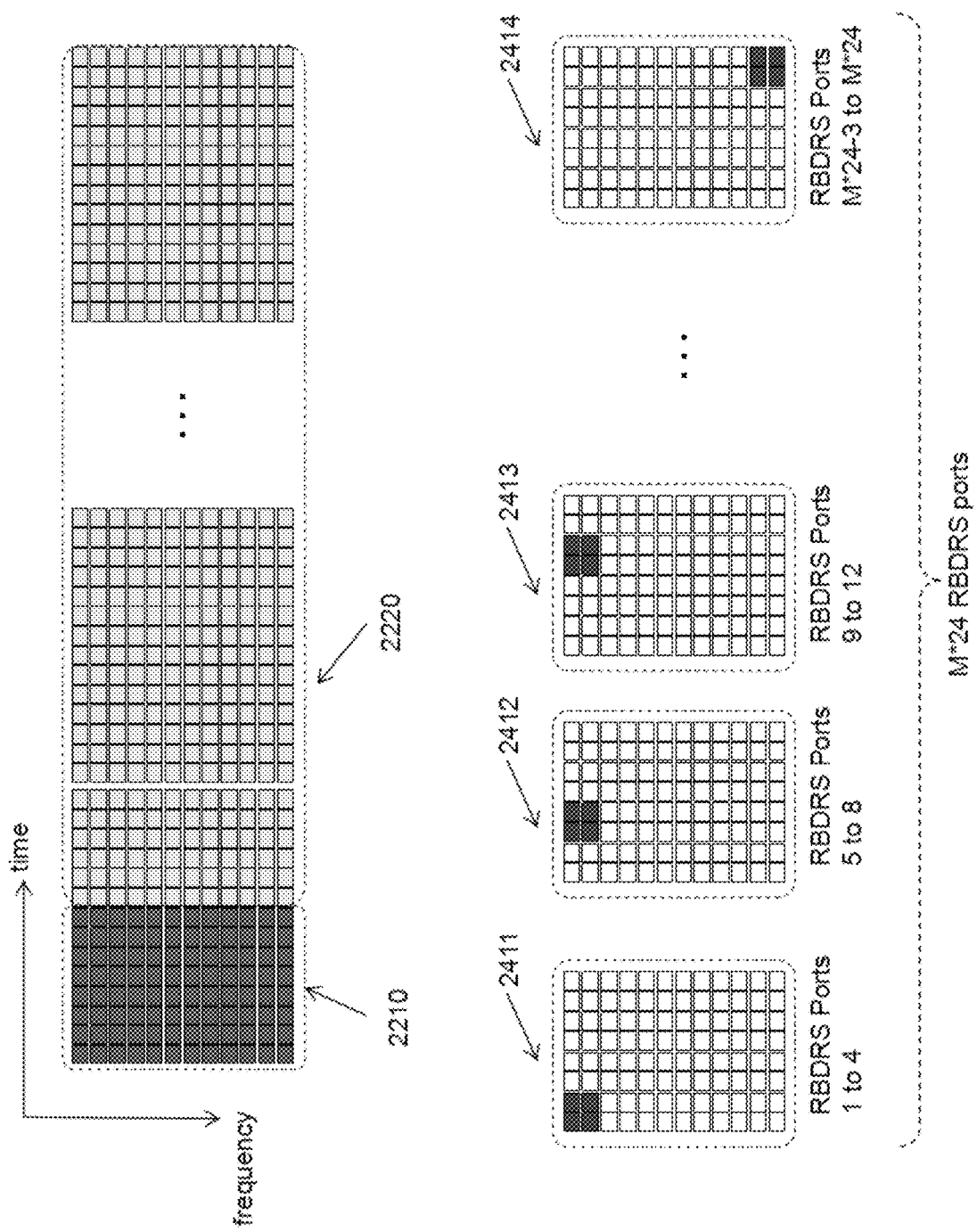
FIG. 24 illustrates yet another exemplary pool of reference signal ports for a transmission with a reference signal region at beginning symbols, in accordance with some embodiments of the present disclosure.

FIG. 16 illustrates yet another exemplary pool of reference signal ports for a transmission with M PRBs and ¹/₇ reference signal overhead, where M*24 RBDRS ports are grouped into M*6 groups each of which have four non-zero symbols on four adjacent or contiguous RE positions. As shown in FIG. 17 and FIG. 18, length-4 OCCs shown in Table 1 1715 or length-4 orthogonal sequences shown in Table 2 1815, may be used to distinguish different RBDRS ports in a same group of FIG. 16. As such, each RBDRS port group is divided into four RBDRS ports based on four length-4 OCC codes or length-4 orthogonal sequences. Other length-4 orthogonal sequences sets can also be used to divide one RBDRS port group into four RBDRS ports. Sixteen length-4 orthogonal sequences sets are shown in Table 3 of FIG. 19, which has totally 64 row with every four contiguous rows constituting a length-4 orthogonal sequences set.

In some embodiments, a larger overhead, such as a $2/7$ overhead may also be used for a very or most sparse reference signal. An extremely sparse reference signal under a larger overhead can follow the designs shown in FIG. 6 to FIG. 18. Although the extremely sparse reference signals shown in FIG. 6 to FIG. 18 are all 1 or 2 symbols at the front of the transmission resource, other positions of the extremely sparse reference signal are also included in the scope of the present teaching. For example, the position of the extremely sparse reference signal can also be in the middle of the transmission resource.

In FIG. 20 to FIG. 24, the extremely sparse reference signal is utilized in a longer-duration transmission resource including: a bandwidth of one PRB in the frequency domain, and a plurality of transmission time intervals (TTIs), e.g. M TTIs, in the time domain. FIG. 20 to FIG. 24 show scenarios in which the reference signal region 2010, 2210 occupies a $1/7$ resource overhead. The extremely sparse reference signal area may be at the starting OFDM symbols of each TTI, e.g. the region 2010 in FIG. 21 and FIG. 22; or be integrated at the starting OFDM symbols of the entire transmission resources, e.g. the region 2210 in FIG. 22 to FIG. 24.

Figure 25:
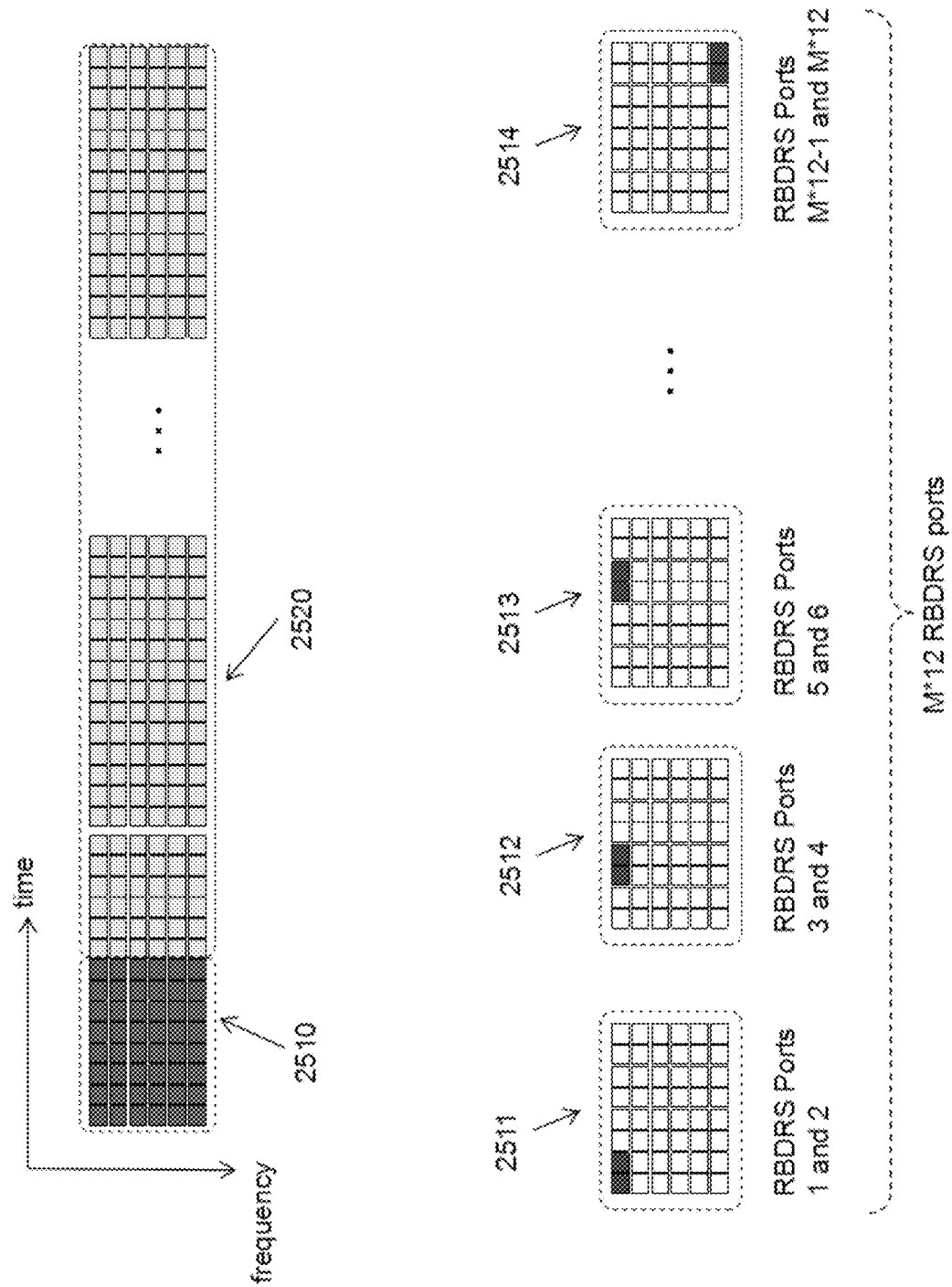
FIG. 25 illustrates an exemplary pool of reference signal ports for a transmission including one PRB with 6 sub-carriers, in accordance with some embodiments of the present disclosure.
Figure 26:
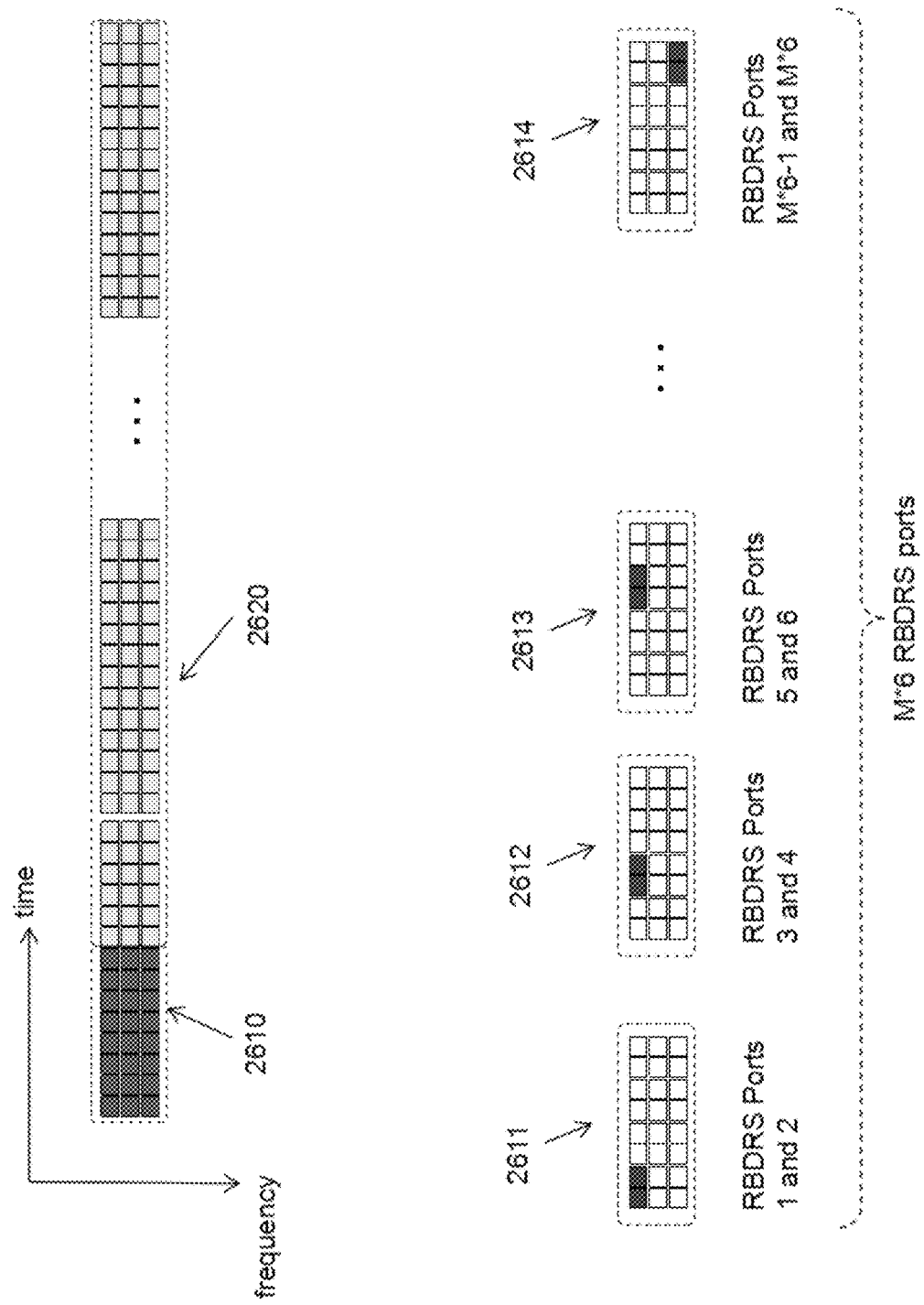
FIG. 26 illustrates an exemplary pool of reference signal ports for a transmission including one PRB with 3 sub-carriers, in accordance with some embodiments of the present disclosure.
Figure 27:
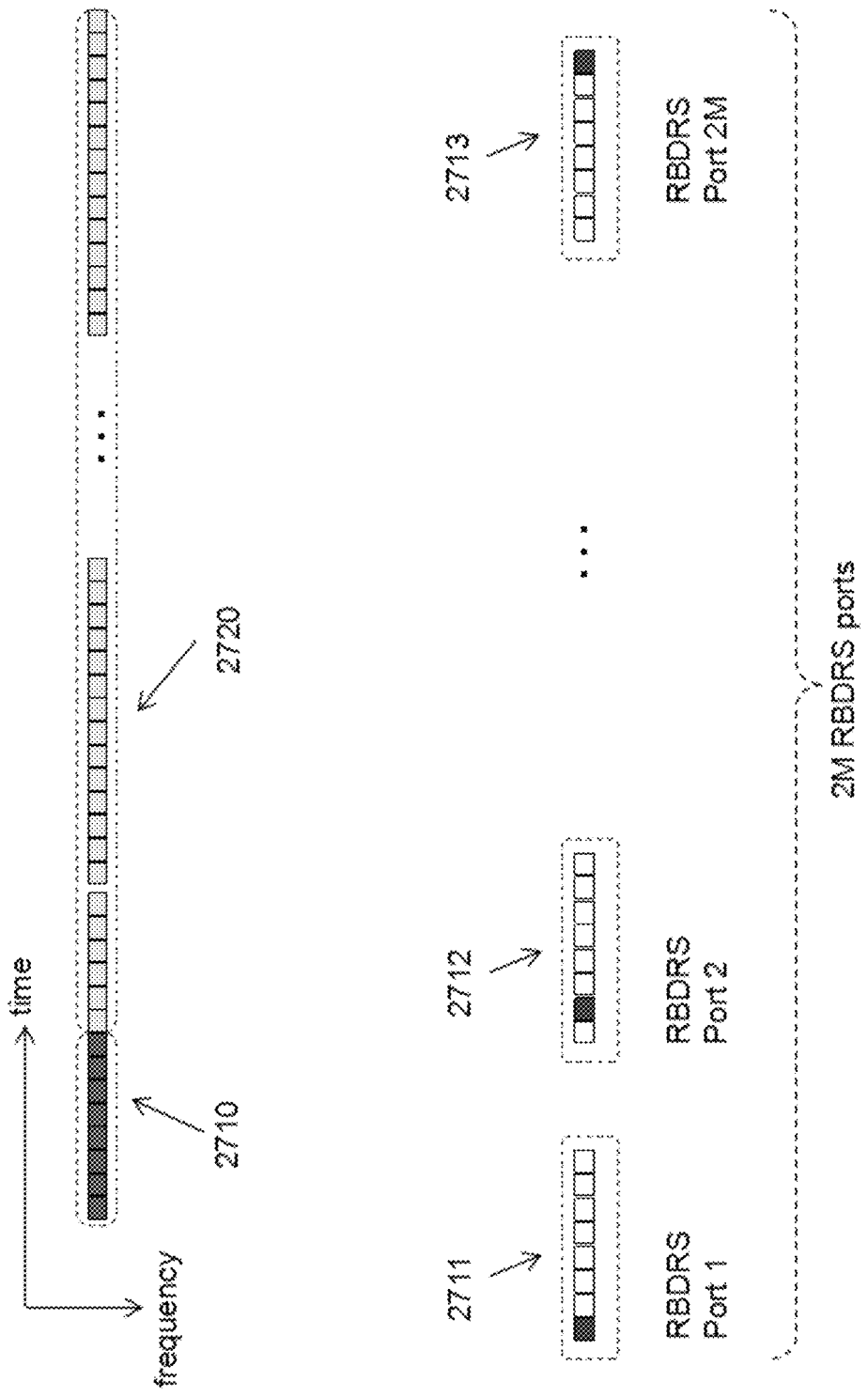
FIG. 27 illustrates an exemplary pool of reference signal ports for a transmission including one PRB with 1 sub-carrier, in accordance with some embodiments of the present disclosure.

In FIG. 25 to FIG. 27, the extremely sparse reference signal is utilized in a transmission resource, wherein each PRB has a bandwidth of less than 12 subcarriers, i.e. less than 12 subcarriers for each OFDM symbol. Assuming there A subcarriers in one PRB bandwidth, and each TTI comprises 14 OFDM symbols, one transmission comprises M TTIs. The extremely sparse reference signal area 2510, 2610, 2710 uses 2*M OFDM symbols. Then the extremely sparse reference signal area 2510, 2610, 2710 includes a total of 2*M*A symbol units (REs), and it can include a maximum of 2*M*A orthogonal extremely sparse reference signals.

The reference signal regions in FIG. 25 to FIG. 27 are under a $1/7$ overhead, i.e. a total of 2*M OFDM symbols are used for the extremely sparse reference signals. In FIG. 25, one PRB bandwidth includes 6 subcarriers (i.e. 6 subcarriers for each OFDM symbol), and there may be a total of M*12 extremely sparse reference signals or RBDRS ports. In FIG. 26, one PRB bandwidth includes 3 subcarriers (i.e. 3 subcarriers for each OFDM symbol), and there may be a total of M*6 extremely sparse reference signals or RBDRS ports. In FIG. 27, one PRB bandwidth includes 1 subcarrier (i.e. 1 subcarrier for each OFDM symbol), and there may be a total of M*2 extremely sparse reference signals or RBDRS ports.

The above embodiments and their derivatives can be applied to both OFDM and DFT-S-OFDM/SC-FDMA waveforms, which have single carrier property and therefore have a merit of low peak-to-average power ratio (PAPR). When the above-mentioned embodiments and their derivatives are applied to DFT-S-OFDM/SC-FDMA, the PAPR of the extremely sparse reference signals may be not significantly larger than that of the data signals. In particular, the extremely sparse reference signal may be used DFT-S-OFDM/SC-FDMA following any one of the schemes shown in FIGS. 7-11 and FIG. 16. Since an extremely sparse reference signal occupies more than one subcarrier, the extremely sparse reference signal with a low peak-to-average ratio should be used. Among them, FIG. 10 shows an extremely sparse reference signal occupying 3 subcarriers, and FIG. 11 shows an extremely sparse reference signal occupying 4 subcarrier, which can utilize the length-3 and length-4 demodulation reference signals (DMRS), respectively, in the uplink DFT-S-OFDM/SC-FDMA transmission schemes of the LTE system, NR system or the NB-IoT system.

Different reference signal ports may be distinguished based on different non-zero symbol positions and different orthogonal sequences. When the reference signal area has N symbols, there may be up to N orthogonal extremely sparse reference signals. In order to further increase the number of reference signals to reduce the collision rate, the orthogonality constraints of the reference signals can be relaxed and a larger number of non-orthogonal sequences can be used to distinguish different extremely or most sparse reference signals. That is, the non-zero symbols in the extremely sparse reference signals can carry a sequence from a set of non-orthogonal sequences. FIG. 19 illustrates a table of exemplary orthogonal and non-orthogonal sequences for generating a pool of reference signal ports, in accordance with some embodiments of the present disclosure. There are 64 length-4 sequences in FIG. 19, grouped into 16 groups. Any two sequences in a same group are orthogonal to each other, but any two sequences from two different groups are non-orthogonal to each other. These sequences may be used to expand the number of RBDRS ports in the RS pool shown in FIG. 16.

Figure 28:
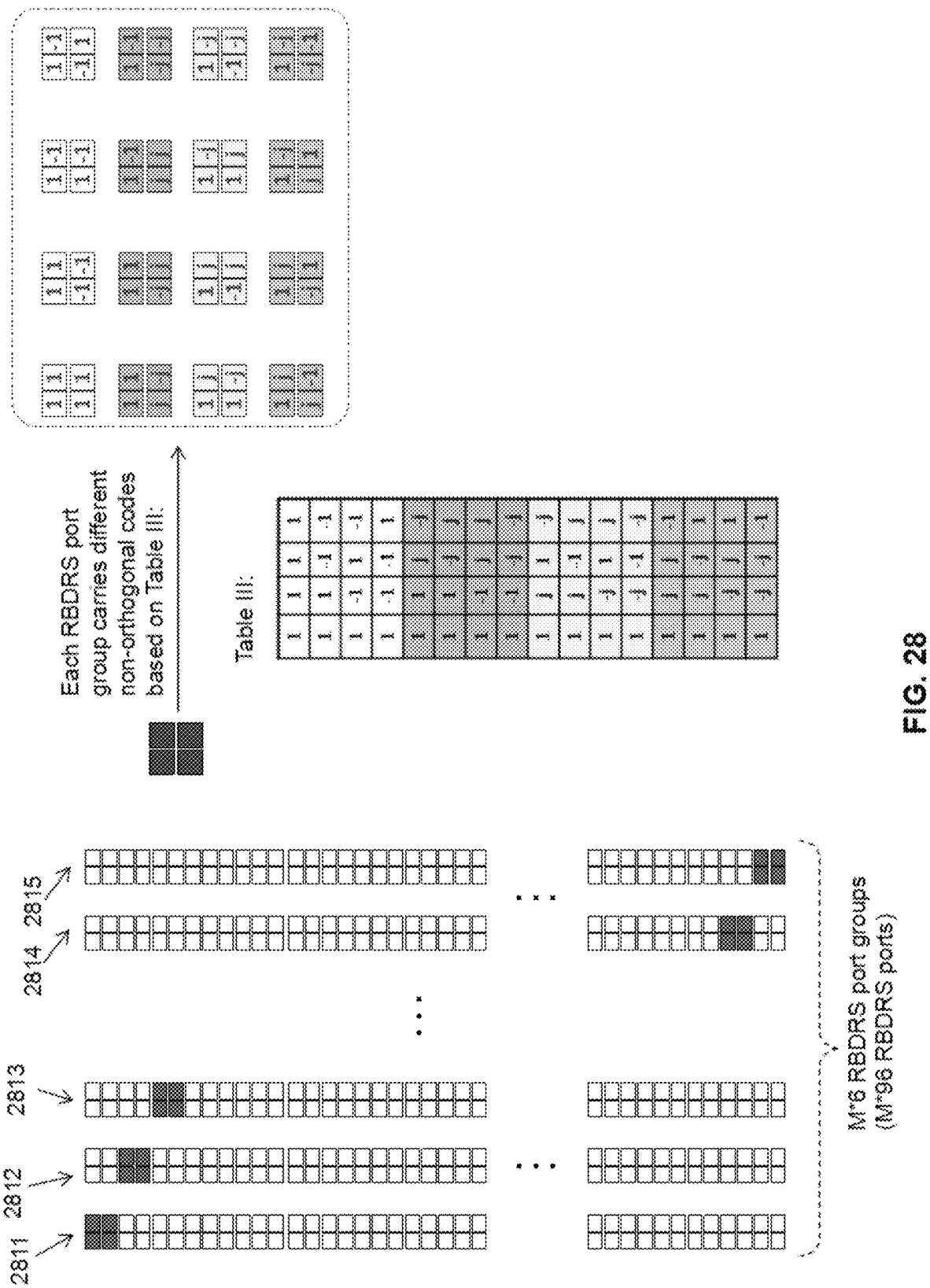
FIG. 28 illustrates an exemplary pool of reference signal ports generated based on non-orthogonal sequences, in accordance with some embodiments of the present disclosure.

FIG. 28 illustrates an exemplary pool of reference signal ports generated based on non-orthogonal sequences, in accordance with some embodiments of the present disclosure. As shown in FIG. 28, each group of extremely sparse reference signals has 4 time-frequency continuous non-zero elements. By carrying 16 length-4 non-orthogonal sequences, 16 extremely sparse reference signals are achieved from one RBDRS group, which is 4 times the references signals based on orthogonal sequences. When there are M PRBs, each PRB has 12 subcarriers and 14 OFDM symbols, and a $1/7$ overhead for the extremely sparse reference signal, the set of non-orthogonal sequences may be used to generate a total of M*24*4=M*96 reference signals. Using the length-4 orthogonal sequences will generate M*24 reference signals. If the 64 length-4 non-orthogonal sequences in FIG. 19 are used, it is possible to obtain 64 extremely sparse reference signals from one RBDRS group, which is 16 times the orthogonal sequence scenario. When there are M PRBs, each PRB has 12 subcarriers and 14 OFDM symbols, and a $1/7$ overhead for the extremely sparse reference signal, the set of non-orthogonal sequences in FIG. 19 may be used to generate a total of M*24*16=M*384 reference signals.

Figure 29:
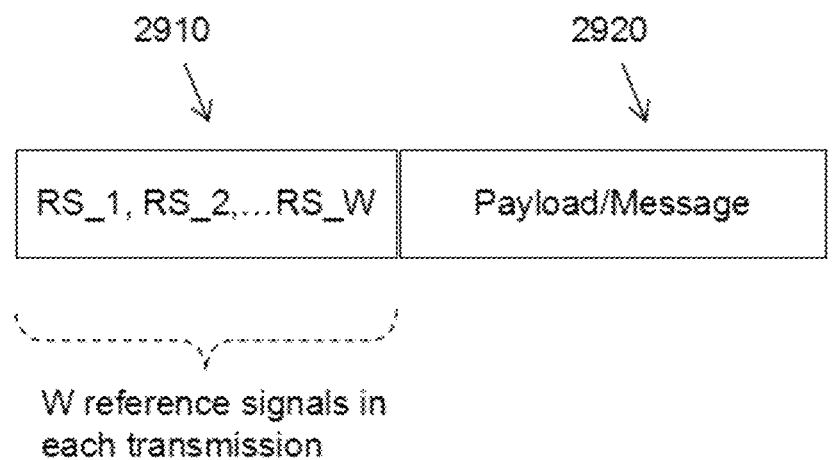
FIG. 29 illustrates an exemplary signal in an uplink transmission, in accordance with some embodiments of the present disclosure.

Further, based on this extremely or most sparse reference signal, the contention-based grant-free access scenarios may be further enhanced. Each access user (or terminal) may autonomously select one or more signals from the set or pool of extremely sparse reference signals, as shown in FIG. 29. When each terminal autonomously selects more than one reference signal, it can further reduce the collision rate of the reference signals. For example, each user autonomously selects two extremely sparse reference signals. Then a collision happens only when both encounter collision with another user's reference signals. As such, the collision probability is much lower than the case of selecting only one reference signal.

The process of autonomously selecting multiple extremely sparse reference signals can have two manners. In a first manner, the user (or terminal) autonomously determines multiple extremely sparse reference signals based on the information (or payload) in a current transmission. Usually, the user (or terminal) autonomously decides multiple extremely sparse transmission signals according to certain bits of the information (or payload) in the current transmission. For example, if the system's predefined set of extremely sparse reference signals contains a total of $2^D$ (i.e., 2 to the power of D) extremely sparse reference signals, the user (or terminal) can determine one extremely sparse reference signal based on D bits of the information (or payload) in the current transmission, determine two extremely sparse reference signals based on 2*D bits of the information (or payload) in the current transmission, and determine W extremely sparse reference signals based on W*D bits of the information (or payload) in the current transmission.

Figure 30:
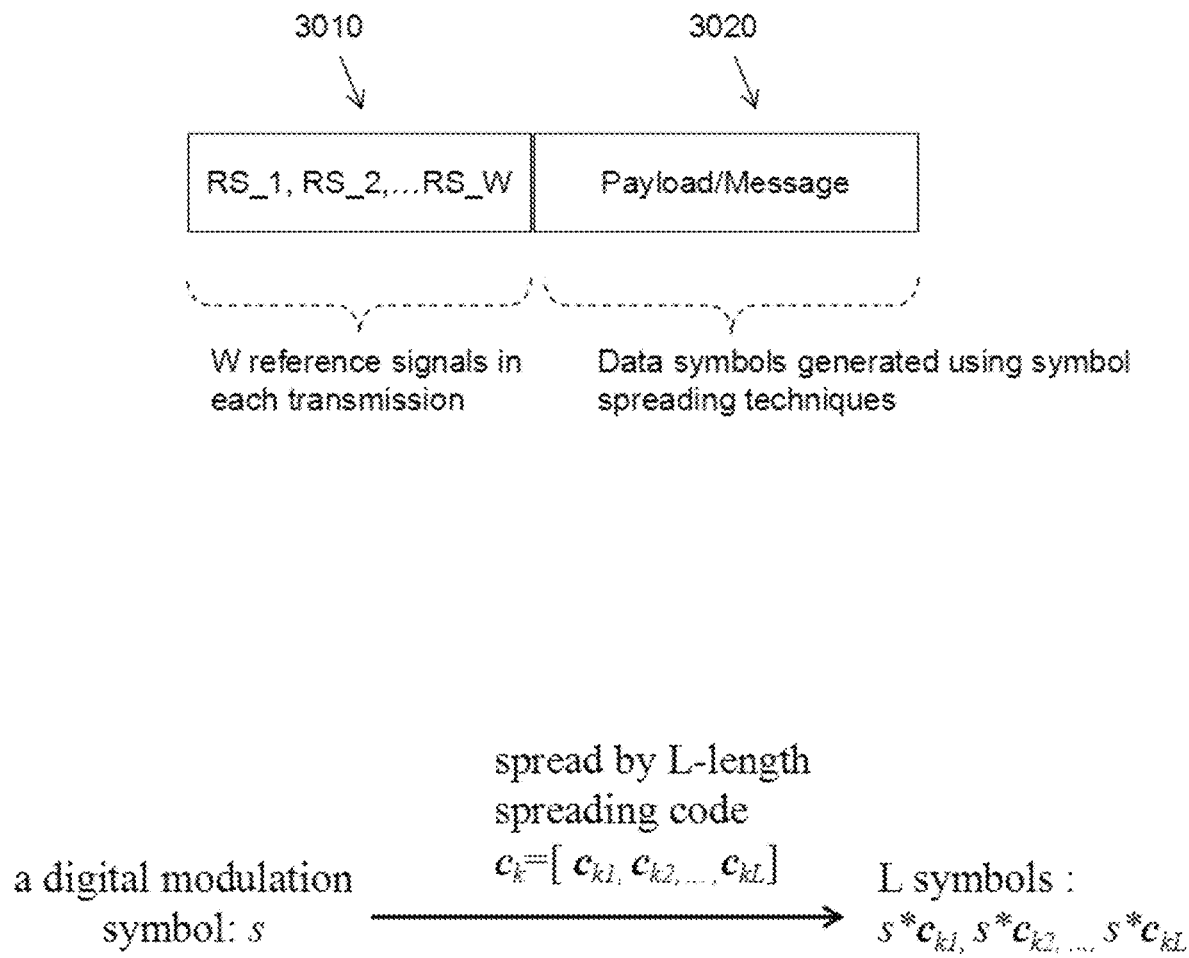
FIG. 30 illustrates an exemplary uplink signal generated based on symbol spreading techniques, in accordance with some embodiments of the present disclosure.

Further, the grant-free access scenarios based on this extremely sparse reference signal technique may be further enhanced by combining with symbol spreading techniques as shown in FIG. 30. That is, the data symbols 3020 transmitted with the pilot signal 3010 including at least one extremely sparse reference signal are generated using the symbol spreading techniques, and the data payload also contains information of the spreading sequence. One typical symbol spreading technique is that each access user (or terminal) spreads its digital modulation symbols, such as BPSK/QPSK symbols, using an L-length spreading code or a spreading sequence like $c_k=[c_{k1}, c_{k2} \ldots c_{kL}]$. For example, spreading a digital modulation symbol s by $c_k$ can generate L symbols $S^*c_{k1}$, $S^*c_{k2}$ $S^*c_{kL}$.

Since the information (or payload) of different users is independent and uncorrelated, multiple extremely sparse reference signals are independently selected by different users, so that the multiple reference signals selected by different users can avoid collision as much as possible.

In addition, different bits of information (or payload) transmitted by one user (or terminal) are usually independent and uncorrelated, and multiple extremely sparse reference signals selected by one user are also independent and uncorrelated. Independence doesn't mean inequality. For example, two sets of D bits in the transmitted information are independent and unrelated, but may also be equal to each other.

From the perspective of the system, the extremely sparse reference signals selected by different users, and the multiple extremely sparse reference signals selected by one user, can be considered random. From this perspective, it can also be considered that each user randomly selects multiple extremely sparse reference signals.

In a second manner, a system's predefined set of extremely sparse reference signals is assumed to contain a total of $2^D$ extremely sparse reference signals, and the user (or terminal) autonomously generates W*D bits. Then through these bits, W extremely sparse reference signals are selected from the extremely sparse reference signal set or pool. These W*D bits are then transmitted together with the information that needs to be transmitted.

These two manners can both achieve good randomness for multiple extremely sparse reference signals selected by different users, thereby significantly reducing the probability of collisions of all reference signals of different users. Moreover, these two manners have a common feature. A transmission of each user contains W extremely sparse reference signals and transmission information (or payload), and the transmitted information or payload contains the information of these W extremely sparse reference signals. For example, it contains the index numbers of the W extremely sparse reference signals. In this way, once the information or payload of a user is decoded successfully, the information of all reference signals used by this user in this transmission can be known, so that interference cancellation of the reference signal can be performed. In the first manner, multiple extremely sparse reference signals are autonomously selected based on the bits of the transmission information (or payload) itself, so that no extra overhead is needed to transmit the information of these extremely sparse reference signals. In the second manner, multiple extremely sparse reference signals are autonomously selected using extra bits, which requires additional overhead to transmit the information of these extremely sparse reference signals, resulting in a less spectrum efficiency.

In one embodiment, a transmission (an access) occupies a total of T symbol resources, and includes reference signals (or pilots) and data. The overhead rate of the reference signal is a, where a is a real number greater than 0 and less than 1. The quantity of extremely sparse reference signals in total is T*a.

For example, a reference signal and a data payload are included in one transmission, which is transmitted through 6 PRBs, where each PRB contains 12*14 REs. The overhead rate of the reference signal is 1/7. When a traditional reference signal (DMRS) scheme is used, the number of reference signals (or say the number of DMRS ports) in total in the RS pool can be up to 12. In the present teaching, under the same 1/7 overhead, the number of pilots or reference signals can be 6*24=144 reference signals, and each reference signal is very sparse, as shown in FIG. 12 when M=6.

These reference signals are defined by the communication system. For example, the communication system can define: how many reference signals the system has, what sequence or pattern each reference signal uses, etc. For example, for an LTE uplink transmission, there are two types of DMRS defined. One type of reference signal is defined based on different cyclic shifts of a sequence, e.g. a Zadoff-Chu (ZC) sequence or a computer-searched ZC-liked sequence including quadrature phase shift keying (QPSK) elements. In addition, OCC codes may be used to define more reference signals. The other type of reference signal is DMRS based on a comb structure or a code division multiplexing (CDM) group structure. In either case, the existing system, the maximum number of reference signals is 24 under a certain overhead (1/7 or 2/7), because reference signals are relied on for channel equalization to estimate the entire wireless channel. In some scenarios, the reference signals are also relied on to estimate a certain time-frequency offset.

The disclosed system in the present teaching can perform channel equalization and time-frequency offset correction based on the data symbols themselves, called blind equalization and blind time-frequency offset correction. The good properties of the data symbols, such as the simple geometric property of low-order modulated (e.g. BPSK, QPSK) data symbol's constellation shape and the second order moment of the received data symbols, are used. As such, there is no need to rely on the reference signals for channel equalization, and therefore there is no need to use the reference signals to estimate the entire wireless channel or the time-frequency offset experienced by the transmission.

In the scenarios where there are multiple receive antennas on the receiving side, when the spatial domain channels of each access user are known, the receiving side can perform appropriate spatial domain combination (or say receive beamforming), which can suppress the multi-user interference and achieve diversity, thus significantly improving multi-user access performance. The use of spatial domain capabilities is very important for multi-user access systems. Although channel equalization and time-frequency offset correction can be performed by the data symbols themselves, the spatial domain combination/receive beamforming cannot be achieved merely based on the data symbols themselves. Therefore, the present teaching proposes to estimate the spatial domain channel, which may include only one channel value of an entire transmission bandwidth experienced by the data symbols, based on very few or very sparse pilots (reference signals), and then perform spatial domain combination/receive beamforming based on this estimated spatial domain channel. The spatially combined data symbols still carry wireless channels and time-frequency offsets. As such, channel equalization and time-frequency offset correction are performed based on the spatially combined data symbols, before demodulation and decoding. In order to improve the performance of multi-user detection, interference cancellation may be performed for the correctly decoded user signals, including the data signals and the reference signals, to enter the next round of iteration, until all possible users are successfully decoded.

As such, the reference signal designed according to embodiments of the present teaching is not for channel equalization, but for spatial domain combination or receive beamforming. That is, the reference signal proposed herein is to estimate each user's spatial domain combination weight, or to estimate the receiving beam of each user, without the need to estimate the entire wireless channel and time-frequency offset of each user. Therefore, the reference signal of each user does not need many resources or many degrees of freedom, or say the small amount of non-zero signal of the reference signal of each user can occupy a very localized time-frequency resource compared with the entire bandwidth and/or time duration of the transmission. Under a given overhead, based on the scheme of extremely sparse reference signals proposed herein, a system can achieve more reference signals or reference signal ports in the RS pool.

In order to pursue extreme performance, a maximum number of reference signals can be designed. For example, for a transmission including 6 PRBs and 1 TTI, with a $\frac{1}{7}$ resource overhead for reference signals, 144 REs are used to carry reference signals. While a traditional scheme has a maximum of 24 DMRS signals, one embodiment of the present teaching can achieve 144 reference signals, as shown in FIG. 12 when M=6. In this case, each reference signal is not a DMRS, but a receive beam detection RS or a receive beam estimation RS.

In one embodiment, each reference signal in the RS pool occupies N symbol resources, and there are a total of N extremely sparse reference signals, where N is an integer. In order to maximize the number of reference signals, it is better to design N pilot resources out of N symbol resources. For example, when a transmission has 6 PRBs and 1 TTI of time-frequency resources, and a $\frac{1}{7}$ RS overhead, N=2*12*6=144 symbols will be used for reference signals. When a maximum of 24 RS ports are defined in an existing system, the present teaching proposes 144 RS ports based on the 144 symbol resources. In the case of semi-persistent scheduling based grant-free uplink transmission, the pilots of the users are orthogonal, and the 144 RS ports can be assigned to a maximum of 144 users. In the case of contention-based grant free uplink transmission, each user can randomly select one RS among the 144 RS ports, which will induce to a much smaller collision probability.

In one embodiment, each reference signal in the RS pool occupies N symbol resources, and there are a total of more than N extremely sparse reference signals, where N is an integer. The non-zero symbols in the extremely sparse reference signals can use non-orthogonal sequences to further expand the number of reference signal ports in the RS pool and reduce collisions. Using orthogonal sequences on the non-zero symbols of the extremely sparse reference signal can achieve at most N extremely sparse reference signals, when there are N symbols in the reference signal region. In order to further increase the number of reference signals and to reduce the collision rate, the orthogonality constraints of the reference signals can be relaxed, and non-orthogonal extremely sparse reference signals can be adopted. That is, a non-zero symbol of the extremely sparse reference signal carries a sequence from a set of non-orthogonal sequences.

As shown in FIG. 28, each group of sparse reference signals has 4 time-frequency continuous non-zero elements. By carrying 16 length-4 non-orthogonal sequences, 16 extremely sparse reference signals are achieved. When there are M PRBs, each PRB has 12 subcarriers and 14 OFDM symbols, with a $\frac{1}{7}$ overhead for the extremely sparse reference signal, the set of non-orthogonal sequences may be used to generate a total of M*24*4=M*96 reference signals. Using the length-4 orthogonal sequences will generate M*24 reference signals.

In one embodiment, each reference signal contains only one reference signal unit (RSU), and the remaining symbol resources of the RS region or RS area have either no signal or a value of zero.

In one embodiment, a transmitter or a terminal autonomously selects one extremely sparse reference signal from the extremely sparse reference signal pool defined by the system. The transmitted information includes information of the selected reference signal. In another embodiment, a transmitter or a terminal autonomously selects W RSs from the pool of the extremely sparse reference signals defined by the system, where W is an integer greater than 1, e.g. 2, 3, or 4. The transmitted information includes information of the selected W reference signals.

At the receiving side, when the receiver or the base station has multiple receive antennas, it may provide a very strong spatial domain capability to improve the performance of multi-user access. In order to obtain this spatial domain capability, one method is disclosed below according to one embodiment.

First, the extremely sparse reference signal can be used to estimate the spatial channel or spatial channel vector $h_k = [h_{k1}, h_{k2} \ldots h_{kR}]^t$ for each access user, where t is the transpose operator.

Second, these estimated spatial domain channels are then used to spatially combine the received signals. Specifically, spatial combination is performed on the user k's signals by: $s_k = w_k^* y$, where, $y=[y_{k1}, y_{k2} \ldots y_{kR}]^t$ represents received signals of R receive antennas, and $w_k = h_k'$ if maximal ratio combining (MRC) is used, or $w_k = h_k'(HH' + \sigma^2 I)^{-1}$ if minimum mean square error (MMSE) based spatially combining is used, $h_k'$ is the conjugate transpose of $h_k$, H is a matrix composed of the spatial channel vectors of all detected users, σ is the mean square deviation of the AWGN, and I is a R*R unit matrix.

Third, the receiver may use the spatially combined data symbol $s_k$ to estimate the channel on the entire transmission bandwidth experienced by user k's signal and to estimate the time-frequency offset. In this estimation, the good properties of the data symbols, such as the simple geometric property of low-order modulated (e.g. BPSK, QPSK) data symbol's constellation shape, are used.

Fourth, a channel compensation and a time-frequency offset compensation are performed with respect to the spatially combined data symbol $s_k$.

Fifth, the receiver can demodulate and decode the data symbols after the compensations of channel and time-frequency offset.

Once the information of a user is decoded successfully, the user's data and reference signal will be removed from the received signal, and then the next round of multi-user detection is performed.

A transmission of each user contains W extremely sparse reference signals and transmission information (or payload), and the transmitted information or payload contains the information of these W extremely sparse reference signals. For example, the transmitted information or payload contains the index numbers of the W extremely sparse reference signals. In this way, once the information or payload decoding of a user is successful, the information of all reference signals used by this user in this transmission can be known, so that interference cancellation of the reference signal can be performed.

In the present application, the technical features in the various embodiments can be used in combination in one embodiment without conflict. Each embodiment is merely an exemplary embodiment of the present application.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication device, the method comprising:
generating a pilot signal occupying N symbol resources, wherein the pilot signal includes at least one reference signal (RS) port that is determined from a predetermined pool of RS ports, wherein the predetermined pool includes at least N RS ports, wherein N is an integer larger than one; and
transmitting a signal comprising the pilot signal and a data payload to a wireless communication node, wherein the data payload includes information related to the pilot signal and the at least one RS port;
wherein:
each of the RS ports in the predetermined pool has Nz non-zero elements; and
Nz is an integer larger than 0 and less than 4
or:
each of the RS ports in the predetermined pool has Nz non-zero elements;
Nz is an integer larger than 0 and less than 9; and
the Nz non-zero elements of each of the RS ports in the predetermined pool are adjacent in time and/or frequency domain.

2. The method of claim 1, wherein:
the pilot signal includes W RS ports each of which is selected or determined independently from the predetermined pool of RS ports; and
W is an integer larger than one.

3. The method of claim 2, wherein W=2, W=3 or W=4.

4. The method of claim 1, wherein the predetermined pool of RS ports is at least one of:
a pool of receive beam detection reference signal ports; and
a pool of receive beam estimation reference signal ports.

5. The method of claim 1, wherein the at least one RS port is selected from the predetermined pool based on at least one bit in the data payload.

6. The method of claim 1, wherein the predetermined pool has exactly N RS ports that are generated based on a plurality of orthogonal cover codes or a plurality of orthogonal sequences.

7. The method of claim 1, wherein the predetermined pool has more than N RS ports that are generated based on a plurality of non-orthogonal sequences.

8. A method performed by a wireless communication node, the method comprising:
receiving, from a wireless communication device, a signal comprising a pilot signal and a data payload, wherein:
the pilot signal occupies N symbol resources,
the pilot signal includes at least one reference signal (RS) port that is determined from a predetermined pool of RS ports,
the data payload includes information related to the pilot signal and the at least one RS port, and
the predetermined pool includes at least N RS ports, and N is an integer larger than one;
wherein:
each of the RS ports in the predetermined pool has Nz non-zero elements; and
Nz is an integer larger than 0 and less than 4;
or
each of the RS ports in the predetermined pool has Nz non-zero elements;
Nz is an integer larger than 0 and less than 9; and
the method further comprises estimating one channel value of an entire transmission bandwidth experienced by signals transmitted by the wireless communication device based on the Nz non-zero elements of each of the RS ports in the predetermined pool.

9. The method of claim 8, wherein:
the pilot signal includes W RS ports each of which is selected or determined independently from the predetermined pool of RS ports; and
W is an integer larger than one.

10. The method of claim 8, wherein the signal is received from the wireless communication device based on a contention-based grant free uplink transmission or a semi-persistent scheduling based grant-free uplink transmission.

11. The method of claim 8, further comprising:
performing a blind channel equalization and/or a blind time frequency offset correction based on the data payload.

12. The method of claim 8, further comprising:
performing a receive beamforming and/or a spatial combination based on the pilot signal to obtain a data signal; and
performing a channel estimation and/or a time frequency offset estimation based on the data signal.

13. The method of claim 8, wherein the predetermined pool has exactly N RS ports that are generated based on a plurality of orthogonal cover codes or a plurality of orthogonal sequences.

14. A wireless communication device comprising:
a memory storing a plurality of instructions; and
a processor configured to execute the plurality of instructions, and upon execution of the plurality of instructions, is configured to:
generate a pilot signal occupying N symbol resources, wherein the pilot signal includes at least one reference signal (RS) port that is determined from a predetermined pool of RS ports, wherein the predetermined pool includes at least N RS ports, wherein N is an integer larger than one, and wherein the data payload includes information related to the pilot signal including the at least one RS port; and transmit a signal comprising the pilot signal and a data payload to a wireless communication node, wherein the data payload includes information related to the pilot signal and the at least one RS port;

wherein:
- each of the RS ports in the predetermined pool has Nz non-zero elements; and
- Nz is an integer larger than 0 and less than 4 or:
- each of the RS ports in the predetermined pool has Nz non-zero elements;
- Nz is an integer larger than 0 and less than 9; and
- the Nz non-zero elements of each of the RS ports in the predetermined pool are adjacent in time and/or frequency domain.

* * * * *